United States Patent
Fok et al.

(10) Patent No.: US 7,400,884 B2
(45) Date of Patent: Jul. 15, 2008

(54) APPARATUS AND METHODS FOR ASSOCIATING A GEOGRAPHICAL POSITION WITH AN EVENT OCCURRING ON A WIRELESS DEVICE

(75) Inventors: Kenny Fok, San Diego, CA (US); Eric Chi Chung Yip, San Diego, CA (US); Mikhail A. Lushin, San Diego, CA (US); Prachi Windlass, Palantine, IL (US); Robert James Tisdale, Cardiff, CA (US)

(73) Assignee: Qualcomm Incorporated, San Diego, CA (US)

( * ) Notice: Subject to any disclaimer, the term of this patent is extended or adjusted under 35 U.S.C. 154(b) by 3 days.

(21) Appl. No.: 11/139,301

(22) Filed: May 27, 2005

(65) Prior Publication Data
US 2006/0246918 A1 Nov. 2, 2006

Related U.S. Application Data
(60) Provisional application No. 60/675,739, filed on Apr. 27, 2005.

(51) Int. Cl.
 *H04M 3/42* (2006.01)
 *H04Q 7/20* (2006.01)
(52) U.S. Cl. .................. 455/414.2; 455/456.1
(58) Field of Classification Search ............. 455/456.1, 455/456.2, 456.3, 456.4, 456.5, 456.6, 414.2; 340/988, 989, 990
See application file for complete search history.

(56) References Cited

U.S. PATENT DOCUMENTS

| | | | |
|---|---|---|---|
| 2002/0042268 A1* | 4/2002 | Cotanis | ..... 455/423 |
| 2004/0002814 A1* | 1/2004 | Gogic | ..... 701/214 |
| 2004/0152362 A1 | 8/2004 | Carter et al. | |
| 2004/0176107 A1 | 9/2004 | Chadha | |
| 2004/0198398 A1 | 10/2004 | Amir et al. | |

FOREIGN PATENT DOCUMENTS

GB 2362231 A 11/2001

\* cited by examiner

*Primary Examiner*—Nick Corsaro
*Assistant Examiner*—Shannon R. Brooks
(74) *Attorney, Agent, or Firm*—James D. McFarland; Thomas Rouse

(57) ABSTRACT

Apparatus and methods for estimating a geographical position corresponding to an event associated with operation of a wireless device communicating in a wireless communications network. The time and distance between the occurrence of the event and the related time and speed of the wireless device of at least one of a first and second geographical position, respectively measured before and after the event, are analyzed. These analyses includes comparing those metrics to predetermined time and distance thresholds to associate and/or estimate a geographic position of the wireless device with the event.

2 Claims, 19 Drawing Sheets

APPARATUS AND METHODS FOR ASSOCIATING A GEOGRAPHICAL POSITION WITH AN EVENT OCCURRING ON A WIRELESS DEVICE

CLAIM OF PRIORITY UNDER 35 U.S.C. §119

The present Application for Patent claims priority to Provisional Application No. 60/675,739 entitled "Methods And Apparatus For GPS Information Validation" filed Apr. 27, 2005, and assigned to the assignee hereof and hereby expressly incorporated by reference herein.

BACKGROUND

The disclosed embodiments relate to wireless devices and wireless communication networks, and more particularly, to apparatus and methods for determining an estimated geographical position of wireless devices corresponding to events associated with wireless devices on a wireless network.

Many wireless communications devices, such as mobile phones, pagers, handheld computers, etc., have the ability to determine the location parameters associated with the geographical position of a wireless device on the surface of the earth. The location parameters may include the position and speed coordinates for the wireless device. The wireless device may include a geographical position location system in the form of hardware, software and/or firmware and other associated parameters.

One exemplary wireless device geographical position location system receives and analyzes location parameters derived from the Global Positioning System (GPS), a radio-navigation system, developed and operated by the U.S. Defense Department, that includes a series of 24 constellation satellites orbiting the earth at a distance of approximately 20,000 kilometers. The GPS position location parameters permit wireless device processors to determine their respective three dimensional positions and velocities using very precise location parameters and timing signals received from the satellites.

Determination of wireless device geographical position location is not limited to GPS. For example, wireless devices may employ a type of Assisted GPS, where the GPS position location parameters are combined with additional information related to the wireless network, such as position information from wireless network base stations, to increase the accuracy of the position location information. The additional information is particularly important in urban areas, where there may be attenuation, blocking and multipath fading of the GPS signal.

Unfortunately, there are other problems associated with the use of GPS and other position location information by the wireless device that have not been addressed. Each time a wireless device requests and retrieves position location information, the request and retrieval processing consumes a relatively large amount of wireless device power. Further, if the wireless device does not support simultaneous voice and data calls, then the device will not be able to get a location position during a voice call, or make a voice call during retrieval of a location position. Also, the period of time from when the wireless device makes a requests for position location information to when the wireless device receives the position location information may be significant, depending on such factors as the relative position of the wireless device to the location of the satellite, the speed at which the wireless device is traveling, the performance of the position location processing system of the wireless device, the type of position location system employed (for example, GPS, Assisted GPS, or other position location system), and the performance characteristics of the wireless device antenna. Such parameters may exacerbate the ability of the wireless device to accurately determine the geographical position location of the wireless device without draining wireless device power sources. The foregoing is particularly troubling when it is important to determine the position of the wireless device upon the occurrence of wireless device operational events, such as a call drop event on a cellular telephone.

BRIEF SUMMARY

To address one or more of the drawbacks of the prior art, the disclosed embodiments provide systems and methods for determining if a given geographical position fix is valid to associate with an event occurring on the wireless device.

In one embodiment, a method for estimating a geographical position corresponding to a wireless device event includes receiving at least one of a first geographical position data of the wireless device corresponding to a first position of the wireless device, and a second geographical position data of the wireless device corresponding to a second position of the wireless device. The method further includes determining an estimated geographical position of the wireless device based on a predetermined relationship between the event and at least one of the first geographical position data and the second geographical position data.

In another embodiment, a method for determining a geographical position location corresponding to an event of a wireless device operating in a wireless network includes receiving geographical position data corresponding to processing of a first geographical position of the wireless device and a second geographical position of the wireless device. The first geographical position of the wireless device and the second geographical position of the wireless device are respectively associated with the event. The method further includes analyzing the geographical position data and generating an estimated geographical position data to associate with the event if any one of the received geographical position data meets a predetermined set of conditions including at least one of a time threshold and a distance threshold with respect to the event.

In yet another embodiment, an apparatus for estimating a geographical position corresponding to a wireless device event includes an event position determination module operable to receive at least one of a first set of location fix information corresponding to a first geographic position of the wireless device and a second set of location fix information corresponding to a second geographic position of the wireless device. In addition, the event position determination module is operable to determine an estimated geographical position of the wireless device to associate with the event based on a predetermined relationship between the event and at least one of the first set of location fix information and the second set of location fix information.

In yet another embodiment, an apparatus for determining a geographical position location corresponding to an event of a wireless device operating in a wireless network includes a geographical position monitoring module for receiving geographical position data corresponding to processing of a first geographical position of the wireless device and a second geographical position of the wireless device. The first geographical position of the wireless device and the second geographical position of the wireless device are respectively associated with the event. The apparatus includes an application executable by the geographical position monitoring module and including an analysis engine operable to analyze the geographical position data and generate an estimated geographical position data corresponding to the event.

In still another embodiment, a system for estimating a geographical position corresponding to a wireless device event includes a means for receiving a first geographical position data of the wireless device corresponding to a first position of the wireless device, and a means for receiving a second geographical position data of the wireless device corresponding to a second position of the wireless device. The system also includes a means for determining an estimated geographical position of the wireless device based on a predetermined relationship between the event and at least one of the first geographical position data and the second geographical position data.

In another embodiment, a wireless device comprises a computer platform having a communications processing engine operable to generate a plurality of event data relating to an operation of the wireless device. The communications processing engine further comprises a position service component operable to determine a geographic position of the wireless device. The wireless device further includes an event tracking module in communication with the computer platform and having an event tracking module defining one of the plurality of events to track. The event tracking module further comprises event tracking logic operable to initiate storage of event information and generate a position determination request upon detecting the defined one of the plurality of events. The wireless device also includes a location module in communication with the computer platform and executable upon receipt of the position determination request to transmit a location fix request to the position service component to initiate retrieval of location fix information. Additionally, the wireless device includes a data log operable to store the event information and the location fix information, wherein the location fix information is linkable with the event information if predetermined conditions are met. In the wireless device, the computer platform is further operable to transmit the data log across a wireless network In a further embodiment, a wireless device comprises a processing means for generating a plurality of event data relating to an operation of the wireless device. The wireless device also includes a determination means for determining a location fix information, including a geographic position, of the wireless device based on receiving a position determination request. The wireless device includes a tracking means for detecting an event, storing event information and generating the position determination request. The detecting means in communication with the processing means and having a definition of one of the plurality of events to detect. The device additionally including a storage means for storing the event information and the location fix information, where the location fix information is linkable with the event information if predetermined conditions are met. And, the wireless device includes a transmission means for transmitting the event information and the location fix information across a wireless network.

Additional aspects and advantages of the disclosed embodiments are set forth in part in the description which follows, and in part are obvious from the description, or may be learned by practice of the disclosed embodiments. The aspects and advantages of the disclosed embodiments may also be realized and attained by the means of the instrumentalities and combinations particularly pointed out in the appended claims.

BRIEF DESCRIPTION OF THE DRAWINGS

The disclosed embodiments will hereinafter be described in conjunction with the appended drawings provided to illustrate and not to limit the disclosed embodiments, wherein like designations denote like elements, and in which.

DETAILED DESCRIPTION

The following discussion is an overview of the embodiments of FIGS. 1-28. In general, these described embodiments deal with apparatus and methods of determining a geographic position to associate with a detected event occurring on a wireless device. In these embodiments, the wireless device detects an event based on a predetermined event tracking configuration. Further, the wireless device includes logic that triggers the retrieval of post-event location fix information upon detection of the event. Additionally, the wireless device may have pre-event location fix information from prior to the occurrence of the detected event. A user manager/server across a wireless network retrieves all of this information from the wireless device, and includes an event position determination module to determine a geographic position to associate with the detected event based on this information. In particular, the event position determination module includes a number of predetermined conditions, based on a number of predetermined parameters, and applies these conditions in a predetermined manner to at least one of the pre- and post-event location fix information in order to make this determination. Generally, these predetermined conditions associate a given geographic position with an event if: (1) a time difference between a time associated with the geographic position and the event time is within a predetermined time threshold; and (2) a distance traveled from the geographic position of the location fix, computed based on a wireless device velocity/speed and the time difference, is within a predetermined distance threshold; or (3) when a velocity/speed of the wireless device associated with the geographic position is not known, and the time difference is within a low time threshold, which is computed as the time needed to travel the predetermined distance threshold at a predetermined maximum speed. Further, if deciding between both a pre- and post-event location fix that satisfy both the time threshold and the distance threshold (both (1) and (2) above), then the determination module associates the fix having the smallest distance traveled with the event. Similarly, if deciding between both a pre- and post-event location fix that satisfy both the time threshold and the low time threshold (both (1) and (3) above), then the determination module associates the fix having the smallest time difference with the event. Thus, these described embodiments provide a relatively uncomplicated solution for determining whether or not to associate a given geographic position with an event occurring on a wireless device. The details of the apparatus and methods are described below.

Figure 1:
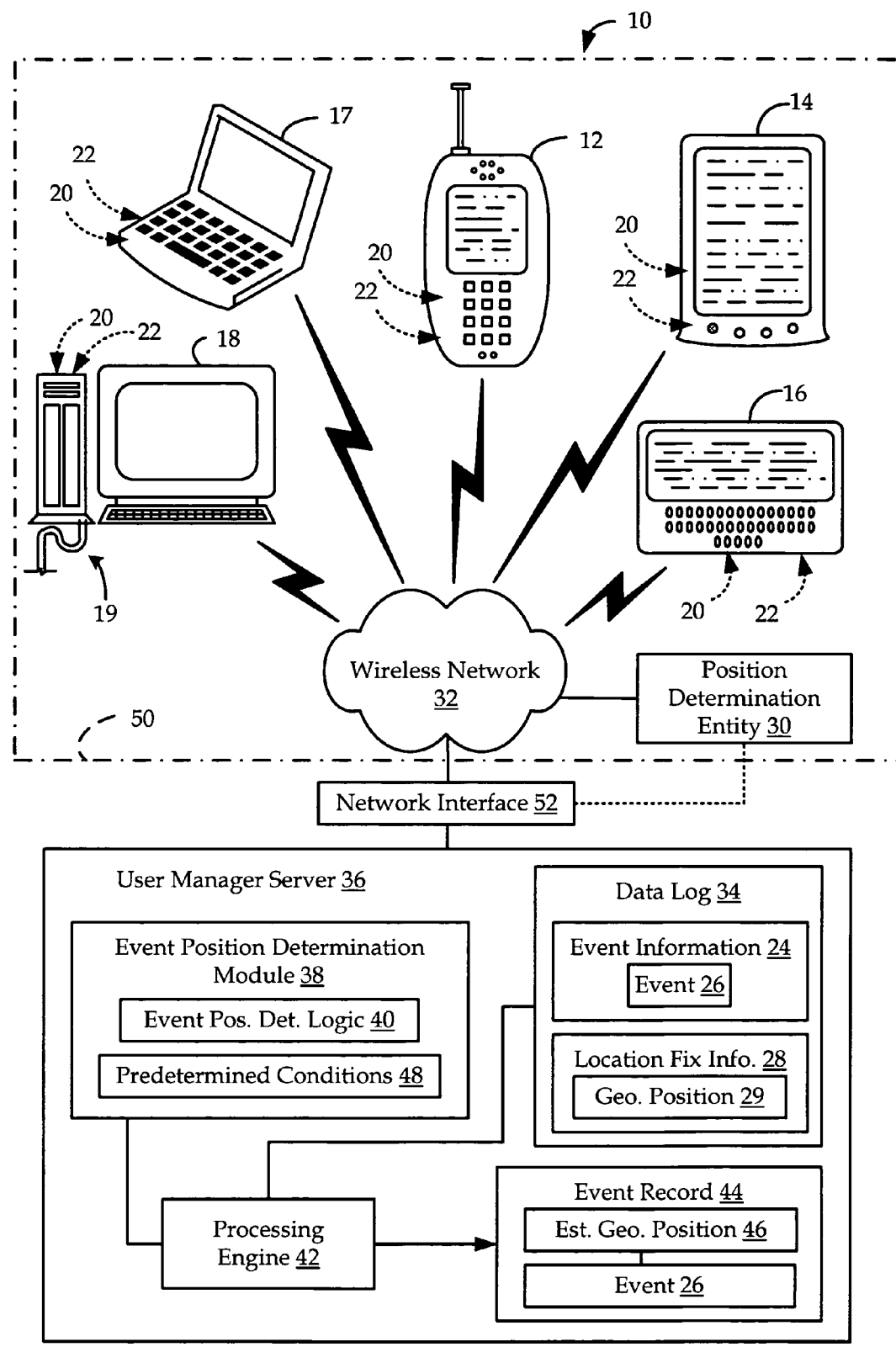
FIG. 1 is a representative diagram of one embodiment of a position system associated with a wireless device and a wireless communication network.
Figure 2:
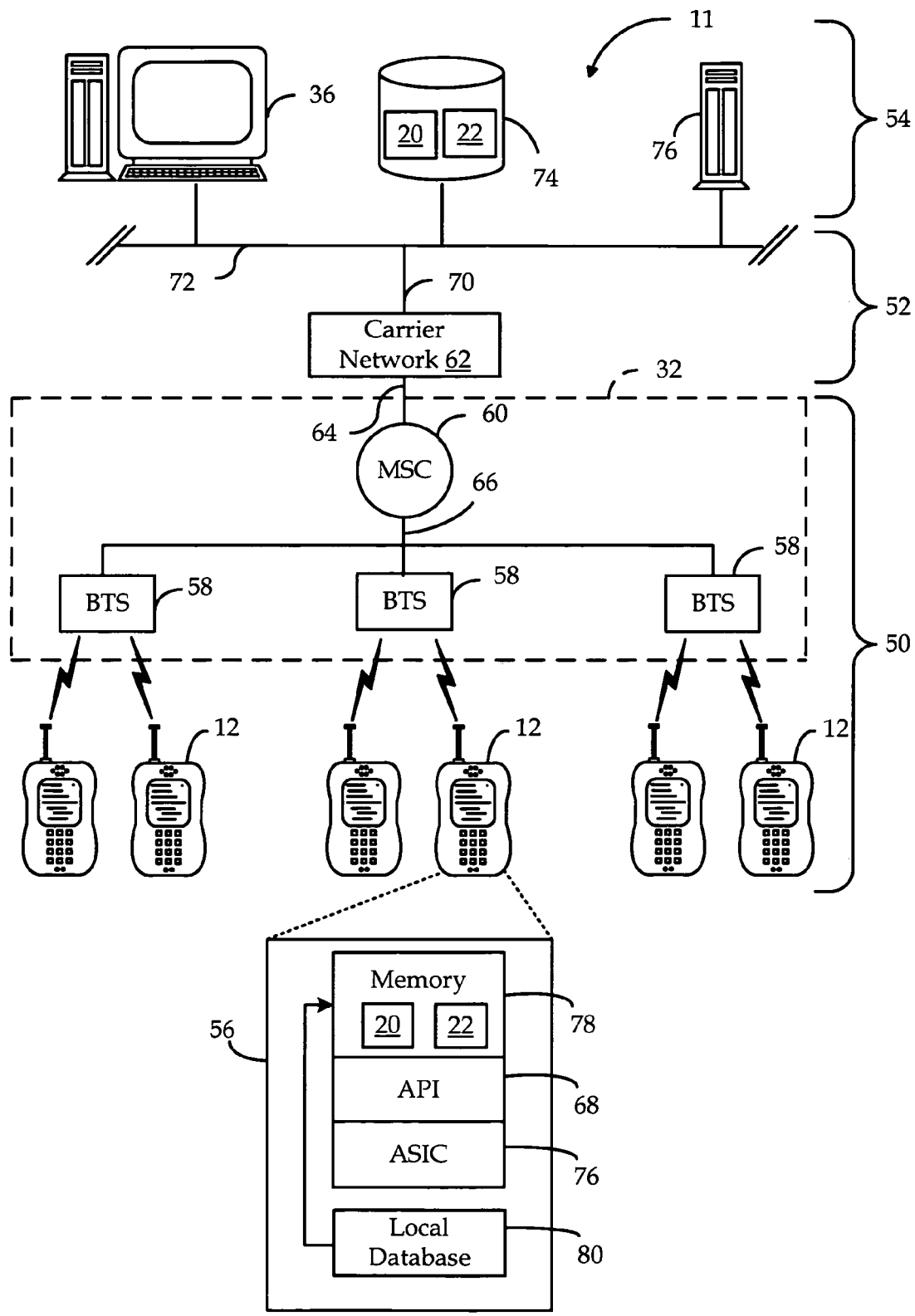
FIG. 2 is a schematic diagram of one embodiment of a cellular telephone network embodiment of the system of FIG. 1, including one embodiment of a computer platform of the computer device of FIG. 1.
Figure 3:
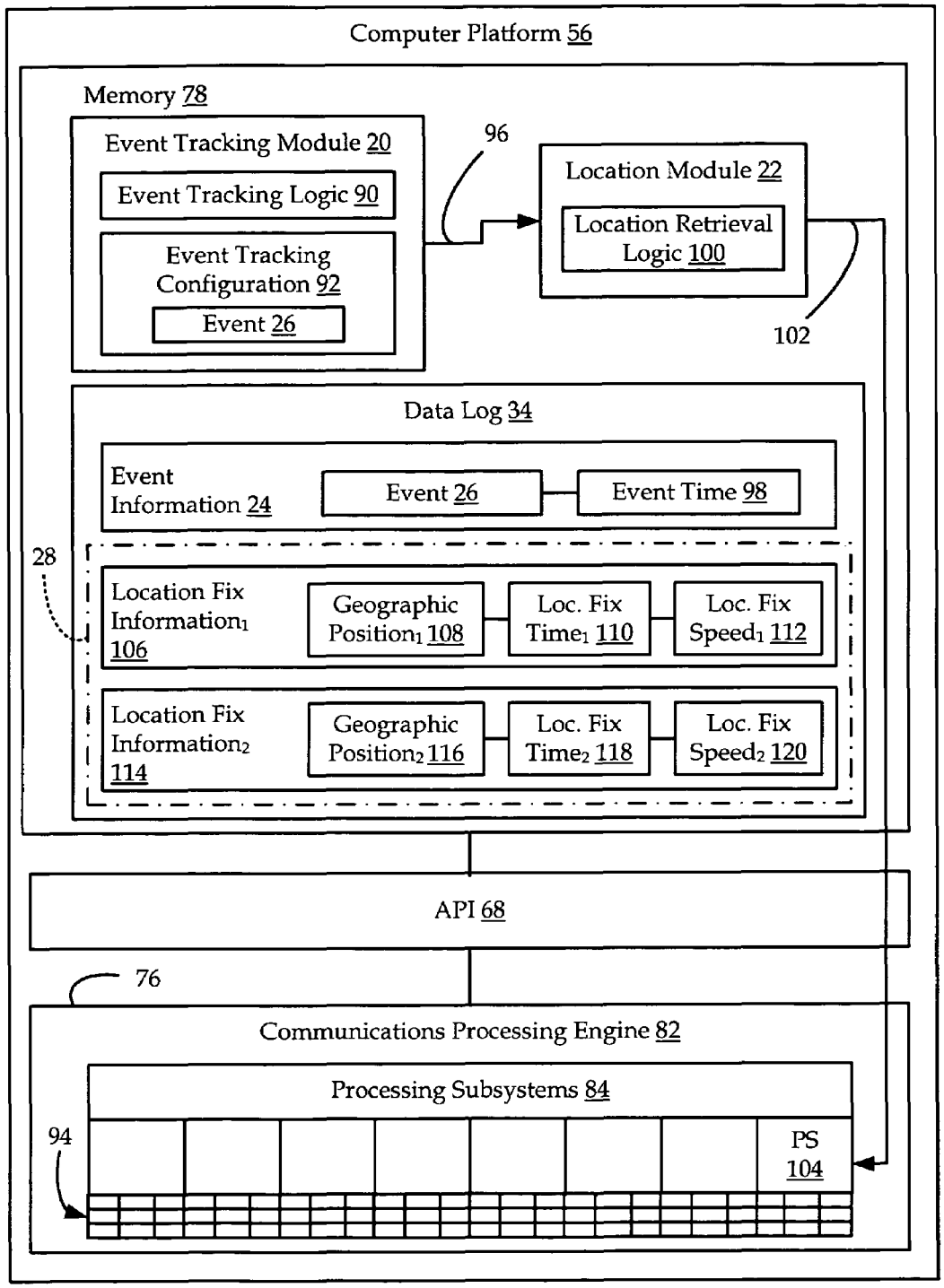
FIG. 3 is one embodiment of an architecture diagram of the computer platform of FIG. 2.

Referring to FIGS. 1-3, one embodiment of a system or apparatus 10 for associating a geographic position with an operational event on a wireless device includes a plurality of wireless devices 12, 14, 16, 17, 18 that each include an event tracking module 20 and a location module 22. Event tracking module 20 is operable to gather event information 24 associated with an event 26 occurring on the respective wireless device, and to cause location module 22 to retrieve location fix information 28, including a geographic position 29, upon detection of event 26. Location module 22 retrieves location fix information 28 from a position determination entity 30 located across wireless network 32. Each respective wireless device 12, 14, 16, 17, 18 stores event information 24 and location fix information 28 in a data log 34, which is retrievable by a user manager server 36 located across wireless network 32. It should be noted that data log 34 may include at least one, or a plurality of location fix information 28, and hence at least one, or a plurality of geographic positions 29. The plurality of location fix information 28 may be caused by prior or subsequent events detected by event tracking module 20, by configured periodic retrievals of location fix information performed by location module 22, and/or by location fix information dictated by other modules or applications operating on the respective wireless device. In any case, user manager 36 includes an event position determination module 38 having logic 40 executable by a processing engine 42 to generate an event record 44 that associates an estimated geographic position 46 with detected event 26 if one or more predetermined conditions 48 are satisfied, as will be discussed in more detail below.

In one embodiment, wireless devices 12, 14, 16, 17, 18 are positioned within a wireless network area 50 and communicate across wireless network 32 with each other, and/or with a user manager server 36. User manager 36 may communicate with wireless devices 12, 14, 16, 17, 18 through a direct, wired connection or through a wireless connection, such as through a network interface 52 in communication with wireless network area 50. The communications between user manager 36 and wireless devices 12, 14, 16, 17, 18 may include, for example, downloads of all, or selected portions (such as particular test suites), of event tracking module 20 and uploads of data logs 34 back to user manager 36.

The following discussion employs FIGS. 1-29 to provide a detailed description of the disclosed embodiments. Beginning with FIG. 1, system 10 illustrated in this figure is a representative diagram of the described embodiments associated with wireless devices functioning in a wireless communication network. FIG. 1 has three main components, namely a first component wireless network area 50, a second component network interface 52, and a third component user manager 36.

Beginning with the first component, wireless network area 50 includes a plurality of wireless devices 12, 14, 16, 17, 18 wirelessly connected to a wireless network 32. The wireless network 32 provides a wireless communications connection across network interface 52 to a user manager server 36.

As illustrated in FIG. 1, the wireless devices can include any mobile or portable communications device, such as cellular telephone 12, personal digital assistant 14, two-way text pager 16, a laptop computer 17, a tablet computer, and even a separate computer platform 18 that has a wireless communication portal, and which also may have a wired connection 19 to a network or the Internet. Additionally, the wireless device can be a remote-slave, or other device that does not have an end-user thereof but simply communicates data across the wireless network 32. For example, the wireless device may include a remote sensor, a diagnostic tool, a data relay, and the like. The described embodiments for estimating a geographical position corresponding to a wireless device event can be applied to any form of wireless communications device or module, including a wireless communication portal, a wireless modem, PCMCIA cards, access terminals, personal computers, telephones, or any combination or sub-combination thereof.

As further illustrated in FIG. 1, wireless network 32 includes any communications network operable, at least in part, for enabling wireless communications between a respective wireless device 12, 14, 16, 17, 18 and any other device connected to wireless network 32. Further wireless network 32 includes all network components, and all connected devices that form the network. Wireless network 32 may include at least one, or any combination, of: a cellular telephone network; a terrestrial telephone network; a satellite telephone network; an infrared network such as an Infrared Data Association (IrDA)-based network; a short-range wireless network; a Bluetooth® technology network; a home radio frequency (HomeRF) network; a shared wireless access protocol (SWAP) network; an ultra wide band (UWB) network; a ZigBee® protocol network; a wideband network, such as a wireless Ethernet compatibility alliance (WECA) network, a wireless fidelity alliance (Wi-Fi Alliance) network, and a 802.11 network; a public switched telephone network; a public heterogeneous communications network, such as the Internet; a private communications network; and land mobile radio network. Suitable examples of telephone networks include at least one, or any combination, of analog and digital networks/technologies, such as: Personal Communications Services, code division multiple access, wideband code division multiple access, universal mobile telecommunications system, advanced mobile phone service, time division multiple access, frequency division multiple access, global system for mobile communication, analog and digital satellite systems, and any other technologies/protocols that may be used in at least one of a wireless communications network and a data communications network.

Each of wireless devices 12, 14, 16, 17, 18 is illustrated to include a resident event tracking module 20 and location module 22. These modules may be located resident to the wireless devices 12, 14, 16, 17, 18, as shown, or alternatively may be remotely accessible from the wireless devices 12, 14, 16, 17, 18. Modules 20 and 22 include any combination of software, hardware, firmware and generally any executable instructions operable by one or more processors resident on or remote from wireless devices 12, 14, 16, 17, 18. The features and functions of resident event tracking module 20 and location module 22, including their components, are described further in the embodiments below.

As noted, the second component of FIG. 1 is network interface 52. Network interface 52 may be any mechanism that allows user manager server 36 and/or position determination entity 30 to communicate with wireless network 32. For example, network interface 52 may include a local area network that connects user manager server 36 and/or position determination entity 30 through an Internet Service Provider to the Internet, which in turn may be connected to a respective wireless device through a carrier network and a base station.

The third component illustrated in FIG. 1 is user manager server 36. User manager server 36 may be any combination of processors, including hardware, firmware, software, and combinations thereof, and memory, including read-only memory ("ROM"), random-access memory ("RAM"), EPROM, EEPROM, flash memory cells, secondary or tertiary storage devices, such as magnetic media, optical media, tape, or soft or hard disk, comprising one or more platforms, such as servers, personal computers, mini-mainframes, mainframes, etc.

User manager server 36 includes data log 34, which is a data repository operable to store a collection of the plurality of location fix information 28 and also event information 24. This information is received by user manager server 36 from across wireless network 32 from each of the wireless devices 12, 14, 16, 17, 18 based on their given configuration. Data log 34 may be resident on user manager server 36, as shown, or remotely accessible from user manager 36. The features and functions associated with data log 34, including its components, are described further in the embodiments below.

Processing engine 42 may be any combination of processors, including an application-specific integrated circuit ("ASIC"), a chipset, a processor, a microprocessor, a logic circuit, and any other data processing device, functioning in association with related memory, including read-only memory ("ROM"), random-access memory ("RAM"), EPROM, EEPROM, flash memory cells, secondary or tertiary storage devices, such as magnetic media, optical media, tape, or soft or hard disk, whether resident on user manager server 36 or remotely accessible from user manager server 36. Processing engine 42 performs one or more processing functions for user manager server 36. Accordingly, processing engine 42 may execute a module resident on or remotely assessable by user manager server 36 to perform a given function. The features and functions associated with processing engine 42, including its components, are described further in the embodiments below.

Event position determination module 38, including its components event position determination logic 40 and predetermined conditions 48, include any combination of software, hardware, firmware and generally any executable instructions operable by one or more processors resident on or remote from user manager server 36. In one embodiment, this module is executed by resident processing engine 42. Event position determination module 38 is executable by user manager server 36, specifically processing engine 42, to manage the collection of data logs 34 from wireless devices 12, 14, 16, 17, 18. Event position determination module 38 may "pull" the logs 34 based on commands from a user, or the logs may be "pushed" from the respective wireless devices 12, 14, 16, 17, 18 at predetermined times or upon reaching predetermined memory/data storage levels. Specifically, processing engine 42 may execute event position determination module 38 to parse and process data log 34 to generate event record 44. In another embodiment, a resident version of event position determination module 38 may be downloaded by user manager server 36 to each wireless device 12, 14, 16, 17, 18 so that each respective device may locally generate event record 44. Additionally, the resident version of event position determination module 38 may also be loaded onto the respective wireless device during the initial assembly process, or via serial connections during a configuration process.

In one or more embodiments, user manager server 36 (or plurality of servers) sends software agents, or applications, including event tracking module 20 and/or location module 22, to wireless devices 12, 14, 16, 17, 18 such that the wireless devices return data from their resident applications and subsystems. Further, there can be separate servers or computer devices associated with user manager server 36 that work in concert to provide data in usable formats, and/or a separate layer of control in the data flow between the wireless devices 12, 14, 16, 17, 18 and user manager server 36.

Event record 44 may be presented in any format, such as in a table, in a graphic, in an audio file, etc., that enables a user of system 10 to utilize the associated event 26 and estimated geographic position 46.

In the disclosed embodiments, access to, processing of, and updating of any of the components of user manager server 36, whether the components are resident on user manager server 36 or remotely accessible by user manager server 36, may be performed by a user, through a user interface, or any combination of software, hardware, firmware and generally any executable instructions operable by one or more processors, through either a direct or remote connection, from any of a wireless device 12, 14, 16, 17, 18, user manager server 36, or any other network component. As one example, through the input of commands by a user through a standard HTTP, an FTP or some other data transfer protocol interfaced with the respective wireless device, processing engine 42 is invoked to execute event position determination module 38 to provide access to and processing of data log 34 to generate event record 44.

FIG. 2 is a more detailed schematic diagram of a cellular telephone embodiment of FIG. 1. The cellular wireless network 11 and plurality of cellular telephones 12 of FIG. 2 are merely exemplary, and the disclosed embodiments can include any system whereby any remote modules, such as wireless devices 12, 14, 16, 17, 18, communicate over-the-air between and among each other and/or between and among components of a wireless network, including, without limitation, wireless network carriers and/or servers. FIG. 2 illustrates three main components, namely the wireless network area 50 of FIG. 1, the network interface 52 of FIG. 1, and a server environment 54. In addition, a local computer platform 56 pertaining to exemplary cellular telephones 12 is illustrated, whose features and functions, including its components, are described further in the embodiments below.

Wireless network area 50 is illustrated to include a plurality of cellular telephones 12. In addition, wireless network area 50 includes wireless network 32, as previously described with respect to FIG. 1. Here, wireless network 32 includes multiple base stations ("BTS") 58 and a mobile switching center ("MSC") 60.

MSC 60 may be connected to network interface 52, specifically its component carrier network 62, through either a wired or wireline connection network 64. For example, network 64 may comprise a data services network, a switched voice services network, often referred to as POTS ("plain old telephone service"), and/or a combination of both, including for example an Internet portion of a network for data information transfer and a POTS portion of a network for voice information transfer. For example, typically, in network 64, network or Internet portions transfers data, and the POTS portion transfers voice information transfer.

MSC 60 may also be connected to the multiple BTS's 58 by another network 66. Network 66 may carry data and/or switched voice information. For example, network 66 may comprise a data network, a voice network, and/or a combination of both, including for example an Internet portion of a network for data transfer and a POTS portion of a network for voice information transfer.

BTSs 58 are wirelessly connected to exemplary cellular telephones 12 in wireless network area 50. For example, BTS 58 may ultimately broadcast messages wirelessly to cellular telephones 12 or receive messages wirelessly from cellular telephones 12, via POTS switched voice service, data transfer services (including short messaging service ("SMS")), or other over-the-air methods.

The use of cellular telecommunication pathways has increased because wireless devices, such as the shown cellular telephones 12, are being manufactured with increased computing capabilities and are becoming tantamount to personal computers and hand-held personal digital assistants ("PDAs"), communicating packets including voice and data over wireless network 32. These "smart" cellular telephones 12 have installed application programming interfaces ("APIs") 68 onto their local computer platform 56 that allow software developers to create software applications that operate on the cellular telephone, and control certain functionality on the device. The features and functions associated with cellular telephones 12, as exemplary of wireless devices 12, 14, 16, 17, 18, including its components, are described further in the embodiments below.

As noted, the second component of FIG. 2 is network interface 52. Although described with respect to FIG. 1, network interface 52 is illustrated in greater detail for the embodiments of this FIG. 2. Specifically, network interface 52 is shown to include carrier network 62, data link 70 and local area network ("LAN") 72.

The features and functions associated with data link 70 and LAN 72 are described below with reference to server environment 54.

Carrier network 62 is any regional, national or international network offering switched voice communication and/or data communication services. As such, carrier network 64 may include switched voice or data service provider communications facilities and lines, including data and/or switched voice information, or any combination of both, including for example an Internet portion of a network for data transfer and a POTS portion of a network for voice information transfer. In one embodiment, carrier network 62 controls messages, generally in the form of data packets, sent to or received from a mobile switching center ("MSC") 60.

The third main component of FIG. 2 is server environment 54. Server environment 54 is the environment wherein the above described user manager server 36 functions. As illustrated, server environment 54 may include the user manager server 36, a separate data repository 74, and data management server 76.

In system 11, user manager server 36 can be in communication over LAN network 72 (of network interface 52) with a separate data repository 74 for storing the data gathered from the remote wireless devices 12, 14, 16, 17, 18, such as the respective data logs 34. Further, data management server 76 may be in communication with user manager server 36 to provide post-processing capabilities, data flow control, etc. User manager server 36, data repository 74 and data management server 76 may be present on the illustrated network with any other network components that are needed to provide cellular telecommunication services. User manager server 36, and/or data management server 76 communicate with carrier network 62 through a data link 70 (of network interface 52) such as the Internet, a secure LAN, WAN, or other network.

Referring back to wireless network area 50, as noted each exemplary cellular telephones 12 may include a local computer platform 56. Each local computer platforms 56 is operable to permit a wireless device 12, 14, 16, 17, 18, such as cellular phones 12, to transmit data across wireless network 32, or receive data from wireless network 32, in addition to receiving and executing software applications, and displaying data transmitted from user manager server 36 or another computer device connected to wireless network 32. Computer platform 56 includes memory 78 (including resident event tracking module 20 and location module 22), application programming interface ("API") 68, application-specific integrated circuit ("ASIC") 76, and local database 80. Each of the aforementioned components may be resident on the wireless devices 12, 14, 16, 17, 18, or alternatively, may be remotely accessible by wireless devices 12, 14, 16, 17, 18. The features and functions associated with local computer platform 56 of wireless devices 12, 14, 16, 17, 18, including its components, are described further in the embodiments below.

FIG. 3 is a more detailed view of local computer platform 56 of any wireless device, such as exemplary cellular telephones 12, shown with reference to FIG. 2 above. The illustrated local computer platform 56 is merely exemplary and can include any system for implementing the functions of the present embodiments. As noted with reference to FIG. 2, and as illustrated in FIG. 3, computer platform 56 includes memory 78, application programming interface ("API") 68, and application-specific integrated circuit ("ASIC") 76. In the disclosed embodiments, each of the aforementioned components may be resident on the wireless devices 12, 14, 16, 17, 18, or alternatively, may be remotely accessible by wireless devices 12, 14, 16, 17, 18.

Beginning with ASIC 76, this component may comprise an application-specific integrated circuit, or other chipset, processor, microprocessor, logic circuit, or other data processing device. ASIC 76 performs one or more processing functions for the respective wireless device. ASIC 76, or another processor, may execute API layer 68 that interfaces with a module resident on or remotely accessible from the wireless devices 12, 14, 16, 17, 18, to perform a given function. The foregoing is performed through API software extensions, as described below. As shown, ASIC 76 may execute, through API layer 68, event tracking module 20 and location module 22.

As shown in FIG. 3, in one or more described embodiments ASIC 76 comprises, in whole or in part, communications processing engine 82. Communications processing engine 82 includes various processing subsystems 84, embodied in hardware, firmware, software, and combinations thereof, that enable the functionality of the respective wireless device 12, 14, 16, 17, 18 and the operability of the respective device on wireless network 32, such as for initiating and maintaining communications, and exchanging data, with other networked devices.

For example, in one embodiment, communications processing engine 82 may include one or a combination of processing subsystems 84, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM, voice services, graphics, USB, multimedia such as MPEG, GPRS, etc.

For the disclosed embodiments, processing subsystems 84 of communications processing engine 82 may include any subsystem components that interact with applications executing on computer platform 56. For example, processing subsystems 84 may include any subsystem components which receive data reads and data writes from API 68 on behalf of event tracking module 20 and location module 22.

API 68 is a runtime environment executing on the respective wireless device. An exemplary runtime environment is Binary Runtime Environment for Wireless® (BREW®) software developed by QUALCOMM, Inc., of San Diego, Calif. Other runtime environments may be utilized that, for example, operate to control the execution of applications on wireless computing devices. API 68 may include a class of software extensions that allow the resident version, or remotely accessible version, of a module to be processed by communications processing engine 82. These software class extensions can communicate with processing subsystems 84 on the wireless device, which allows both data reads and commands. For example, the software extension can send commands on behalf of the applications that invoke it. The module can then forward the responses of the subsystems ultimately across wireless network area 50 to user manager server 36. Each resident application or module on wireless device can create an instance of this new software extension to communicate with the subsystems independently.

Memory 78 may be any type of memory, including read-only memory ("ROM"), random-access memory ("RAM"), EPROM, EEPROM, flash memory cells, secondary or tertiary storage devices, such as magnetic media, optical media, tape, or soft or hard disk, whether resident on computer platform 56 or remotely accessible from computer platform 56. Computer platform 56 may also include a local database 80 (FIG. 2) that can hold the software applications, files, or data not actively used in memory 78, such as the software applications or data downloaded from user manager server 36. Local database 80 typically includes one or more flash memory cells, but can be any secondary or tertiary storage device, such as magnetic media, EPROM, EEPROM, optical media, tape, or soft or hard disk. Additionally, local database 80 can ultimately hold a local copy of event tracking module 20 and location module 22.

In one embodiment, memory 78 includes event tracking module 20 having logic 90 executable by communications processing engine 82 through API 68 to identify a predetermined event 26 based on an event tracking configuration 92 that defines parameters for monitoring processing data 94 within processing subsystems 84. For instance, user manager 36 may be utilized to develop and transmit event tracking configuration 92 to the respective wireless device. Event tracking configuration 92 may identify what processing data 94 to monitor, when to monitor the processing data, how to collect and store the data, and when to transmit the collected data to user manager 36. Additionally, processing data 94 within subsystems 84 may include predetermined events, predetermined data, and/or predetermined sequences or sets of data and/or events. Upon detection of event 26 as defined by event tracking configuration 92, event tracking logic 90 causes event information 24 to be stored in data log 34. In one embodiment, for example, event information 24 comprises event 26, such as a description, indicator and/or representation of the configured event, and event time 98, such as a timestamp corresponding to the time of occurrence of the event. Further, upon detection of event 26, event tracking logic 90 triggers a position determination request 96 to be sent to location module 22.

Location module 22 has location retrieval logic 100 operable to allow location module 22 to receive position determination request 96 and subsequently generate a location fix request 102 through API 68 to a designated processing subsystem component, such as a position service component 104. Additionally, location retrieval logic 100 is executable to initiate storage of the resulting location fix information 28 in data log 34. Location fix information 28 may include a geographic position or location fix of the wireless device and a location fix time associated with the geographic position. Additionally, depending how the geographic position is determined, location fix information 28 may also include an associated location fix velocity or speed of the wireless device.

There may be a plurality of location fix information 28 stored in data log 34. As such, there may be a first set of location fix information 106 having a first geographic position 108, a first fix time 110 and a first fix speed 112, where first fix time 110 is a time prior to event time 98. Additionally, there may be a second set of location fix information 114 having a second geographic position 116, a second fix time 118 and a second fix speed 120 associated with location fix request 102 triggered by the occurrence of event 26, where second fix time 118 is a time after event time 98.

In one embodiment, position service ("PS") component 104, when executed by communications processing engine 82, retrieves location fix information 28 from an external source, such as position determination entity 30 (FIG. 1). PS component 104 may perform its functions, for example, based on the aforementioned location fix request 102, upon powering up of the wireless device, upon initiating execution of a given application or module, upon predetermined time intervals, upon other specific requests from other applications or modules, and/or upon a synchronized time basis, etc. In the disclosed embodiments PS component 104 is one example of a component used in coordination with, or in relation to, the components of location module 22.

Location module 22 may comprise, in whole or in part, a geographic information system ("GIS"), such as a tool used to gather, transform, manipulate, analyze, and produce information related to the surface of the earth. Such a GIS can be as complex as a whole system using dedicated databases and workstations hooked up to a network, or as simple as "off-the-shelf" desktop software. One example of such a system may include the QPoint™ Positioning Software and gpsOne® hybrid Assisted GPS wireless location technology, available from QUALCOMM, Inc. of San Diego, Calif.

In one embodiment, such a GIS may include a global positioning system ("GPS"), such as a satellite navigational system formed by satellites orbiting the earth and their corresponding receivers on the earth. The GPS satellites continuously transmit digital radio signals that contain data on the satellites' location and the exact time to the earth-bound receiver. The satellites are equipped with atomic clocks that are precise, for example, to within a billionth of a second.

Based on this information the receivers know how long it takes for the signal to reach the receiver on earth. As each signal travels at the speed of light, the longer it takes the receiver to get the signal, the farther away the satellite is located. By knowing how far away a satellite is, the receiver knows that it is located somewhere on the surface of an imaginary sphere centered at the satellite. By using three satellites, GPS can calculate the longitude and latitude of the receiver based on where the three spheres intersect. By using four satellites, GPS can also determine altitude. In addition to transmitting location parameters associated with the location of the wireless devices, the GPS satellites may also transmit speed parameters associated with the speed of the wireless devices.

In another embodiment, such a GIS may include, in whole or part, a network-based positioning system whereby location module 22, PS component 104, and/or some other remote position determination entity 30, determine the geographical position of the wireless devices based, at least in part, on network communications. For instance, communication signals may be exchanged between the respective wireless device and network components of wireless network area 50. These communication signals include timing information that enables location module 22, PS component 104, and/or some other remote position determination entity 30 to compute a relative position, and hence a geographic position, of the wireless device with respect to a known position. For example, such communications signals may include the signals periodically exchanged between wireless devices 12, 14, 16, 17, 18 and BTS 58. Such a network-based system may also be utilized in combination with a GPS-based system.

Figure 4:
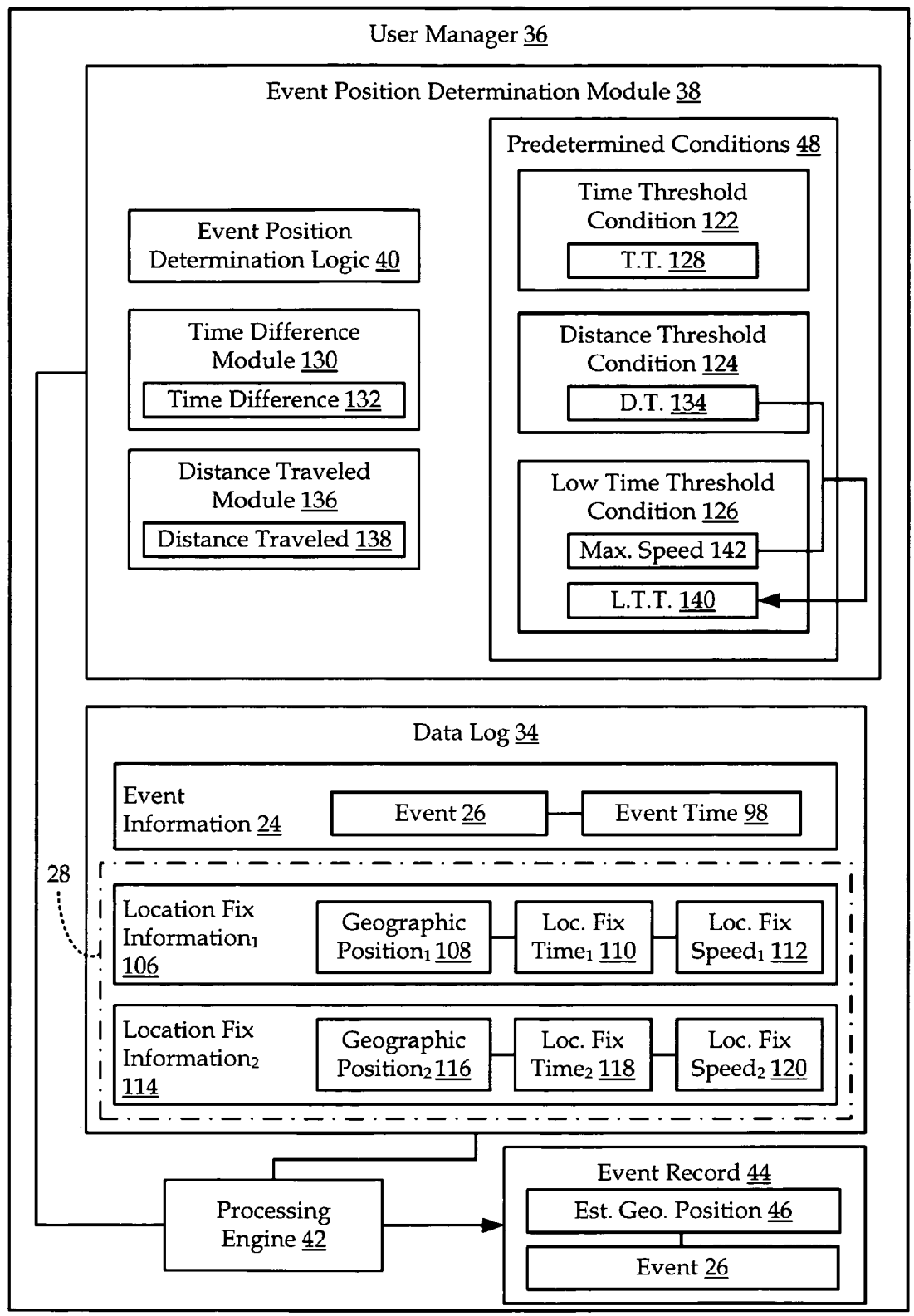
FIG. 4 is one embodiment of an architecture diagram of the user manager of FIG. 1.

Referring to FIG. 4, as noted above, user manager 36 receives data log 34 from the respective wireless device 12, 14, 16, 17, 18 in order to determine if there is a geographic position that can be associated with a detected event. Event position determination module 38 includes event position determination logic 40 that reviews the information contained within data log 34 in view of one or more predetermined conditions 48 that test a perceived validity of a geographic position under consideration to be associated with event 26. For example, in one embodiment, predetermined conditions 48 include a time threshold condition 122, a distance threshold condition 124, and a low time threshold condition 126. In one embodiment, these conditions determine whether or not a given set of location fix information, and hence a given geographic position, is close enough to the event in a distance domain, based on speed information contained in the location fix information, to be associated with the event. Ultimately, in this embodiment, these conditions attempt to select as an estimated geographic position the position associated with the location fix that is closest in distance to the actual position of the event. When speed information is not available with the location fix information, then these embodiments look to the time difference between the event time and the respective location fix and, for example, select the smallest time difference.

In one embodiment, for example, time threshold condition 122 includes a predetermined time threshold value 128 corresponding to a desired maximum amount of time between the occurrence of event 26 and the time of the geographic location fix in order for the fix to be considered for association with the event. Time threshold value 128 may vary depending on the situation. For instance, a first scenario where it is known that the wireless device is moving at a relatively fast speed may have a smaller time threshold value 128 than a second scenario where it is known that the wireless device is moving at a relatively slow speed, i.e. a speed slower than the first scenario speed. In one embodiment, event position determination logic 40 invokes a time difference module 130 to calculate a time difference 132 between event time 98 and a location fix time, such as first fix time 110 or second fix time 118, associated with a geographic position, such as first geographic position 108 or second geographic position 116, retrieved from data log 34. Further, event position determination logic 40 causes processing engine 42 to compare time difference 132 to time threshold value 128 to determine if time threshold condition 122 is achieved.

Distance threshold condition 124 includes a predetermined distance threshold value 134 corresponding to a desired maximum distance between the location of event 26 and the location of the geographic location fix in order for the fix to be considered for association with the event. Distance threshold value 134 may vary depending on the situation. For instance, a first scenario where a user of these apparatus and methods desires a very accurate geographic position to associate with the event may have a smaller distance threshold value 134 than a second scenario where the user requires a less accurate geographic position, i.e. a position that may be further away from the actual event position when compared to the associated position in the first scenario. In one embodiment, event position determination logic 40 invokes a distance traveled module 136 to calculate a distance traveled 138 based on time difference 132 associated with a given set of location fix information and a wireless device speed associated with the fix information, such as first fix speed 112 or second fix speed 120 associated, respectively, with first geographic position 108 or second geographic position 116, as retrieved from data log 34. Further, event position determination logic 40 causes processing engine 42 to compare distance traveled 138 to distance threshold value 134 to determine if distance threshold condition 124 is achieved.

Low time threshold condition 126 includes a predetermined low time threshold value 140 corresponding to a desired maximum amount of time between the occurrence of event 26 and the time of the geographic location fix, in order for the fix to be considered for association with the event, when a corresponding wireless device speed is not available with the fix. For instance, event position determination logic 40 computes low time threshold value 140 as a function of distance threshold value 134 divided by a predetermined maximum speed value 142. The predetermined maximum speed value 142 corresponds to a desired maximum speed to be associated with the respective wireless device in a situation where speed information is not available as a part of a given set of location fix information 28. Predetermined maximum speed value 142 may vary depending on the situation. For instance, predetermined maximum speed value 142 may be a higher value in a first scenario evaluating wireless devices operating on a highway when compared to a second scenario where the wireless devices are operating in city streets. In one embodiment, event position determination logic 40 causes processing engine 42 to compare time difference 132 to low time threshold value 140 to determine if low time threshold condition 126 is achieved.

It should be noted that time threshold value 128, distance threshold value 134 and predetermined maximum speed value 142, either individually or in any combination, may be set as default values, or they may be modifiable by a user of system 10.

Further, time threshold value 128, distance threshold value 134 and predetermined maximum speed value 142 can each vary depending on the scenario being tested, the environment associated with the test scenario, the type of wireless device, the type of wireless network components, the type of wireless communications protocol, the type of and retrieval speed of the particular service providing the location fix information, as well as other subjective factors, such as a desired relative accuracy or granularity of the associated geographic position. In one non-limiting example, for instance, one test scenario involved call drops by CDMA-based cellular telephones in an urban area. In this example, hundreds of sets of data were analyzed, including the call drop event and the location fix information, and it was determined that most of the valid fixes were obtained within 120 seconds of the call drop event, and based on a marketing analysis, an accuracy of 2000 feet was desired. Further, since this test scenario occurred in an urban area close to a highway, a maximum speed of 65 miles per hour was expected. Thus, in this one example, time threshold value 128 was set at 120 seconds, distance threshold value 134 was set at 2000 feet, and maximum speed was set at 65 miles/hour. It should be stressed, however, that this is just one non-limiting example, and that each of these thresholds may vary dramatically depending on the many factors discussed above.

Based on the outcomes of testing the information contained in data log 34 against one or any combination of the predetermined conditions 48, event position determination logic 40 may be executable to associate one set of location fix information 28 with a set of event information 24, and hence to determine estimated geographic position 46 of event 26.

Event record 44 can give a ready view of estimated geographic position 46 and event 26 in any form, such as tables, maps, graphics views, plain text, interactive programs or web pages, or any other display or presentation of the data. Event record 44 includes any form of output that represents a position related characteristic or parameter, as well as any other related data, associated with the event information from data log 34 of one or more respective wireless devices.

In operation, system 10 implements a method of associating a geographic position with an event that occurs on a wireless device. In one embodiment, the method evaluates at least one set of location fix information to determine if the geographic position associated with the fix is appropriate to associate with the event based on one or more conditions.

Figure 5:
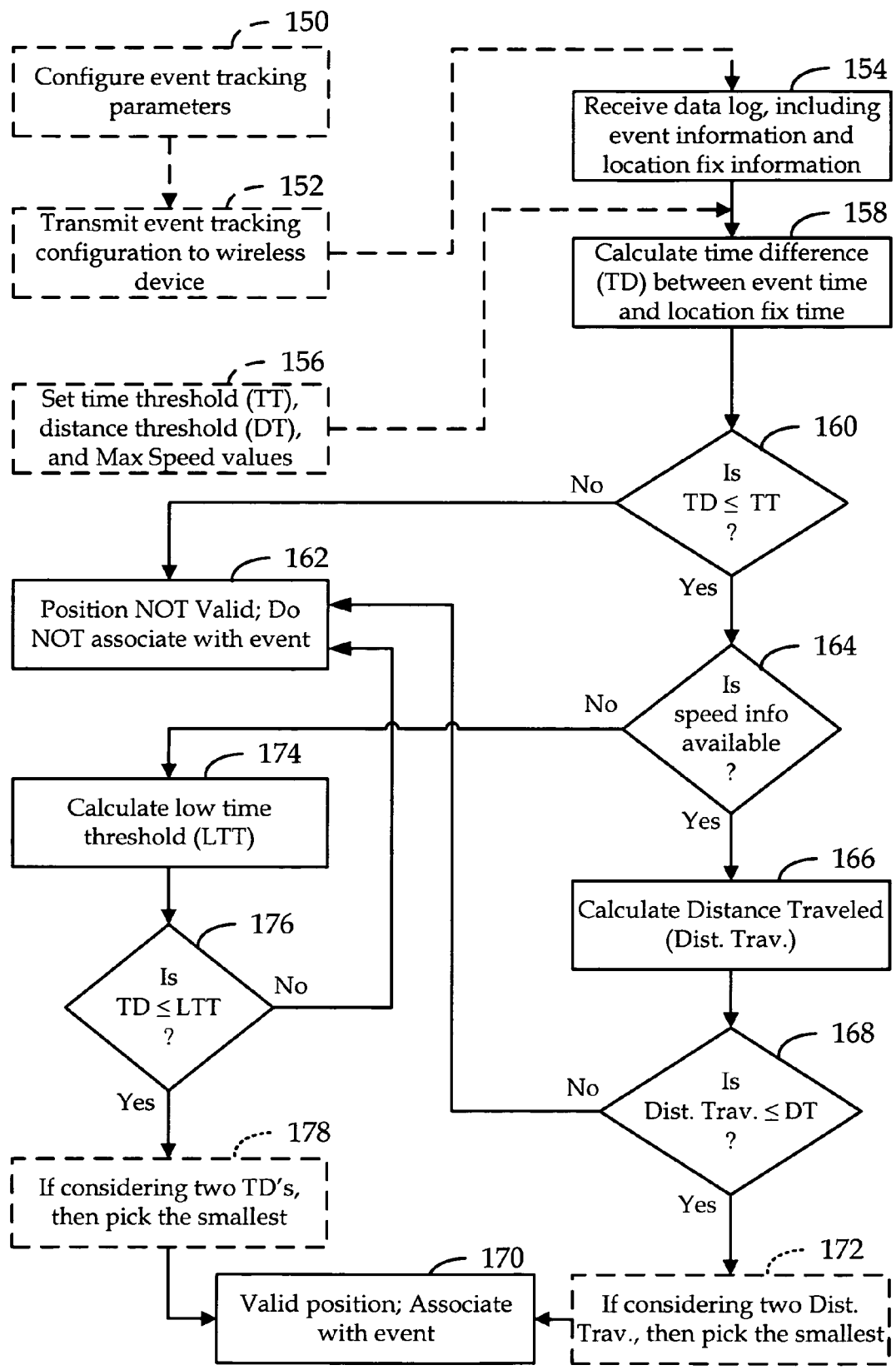
FIG. 5 is a flowchart of one embodiment of a method of associating a geographic position with an event occurring on a wireless device.

In one embodiment, referring to FIG. 5 for example, the method optionally involves receiving event tracking parameters comprising an event tracking configuration to identify a predetermined event associated with data processed by a wireless device (Block 150). The method further optionally involves transmitting the event tracking configuration to the respective wireless device (Block 152), such as by transmitting the configuration across a wireless network. These actions may be performed, for example, by a technician, field service engineer or any other operator of user manager server 36. The result of these actions is event tracking configuration 92 utilized by event tracking module 20 of the respective wireless device 12, 14, 16, 17, 18.

Further, the method includes receiving and storing one or more data logs from the respective wireless device, where the data logs include event information and location fix information as dictated by the event tracking configuration (Block 154). In one embodiment, event tracking module 20 and location module 22 are executable by communications processing engine 82 of the respective wireless device 12, 14, 16, 17, 18 to collect event information 24 and location fix information 28 in data log 34, such as based on the detection of a predetermined event 26.

Additionally, the method may optionally include receiving settings for a predetermined time threshold, a predetermined distance threshold and a predetermined maximum speed (Block 156). As mentioned above, these settings may be user-defined or predefined, default values of time threshold 128, distance threshold 134 and maximum speed 142. These values may be entered into event position determination module 38 by an operator of user manager 36.

After receiving the data log, the method includes calculating a time difference between the event time and the location fix time in the data log (Block 158). In one embodiment, processing engine 42 executes event position determination logic 40 to invoke time difference module 130 to calculate time difference 132, as detailed above.

The method continues by determining if the time difference meets the time threshold condition (Block 160). In one embodiment, processing engine 42 executes event position determination logic 40 to compare time difference 132 to time threshold 128, as detailed above.

If the time difference is greater than the time threshold, then the method concludes that the geographic position associated with the location fix information may not be validly associated with the event associated with the event information (Block 162).

If the time difference meets the time threshold condition, then the method continues by determining if a speed is available in association with the location fix information (Block 164).

If the speed is available, then the method continues by calculating the distance traveled (Block 166). In one embodiment, processing engine 42 executes event position determination logic 40 to invoke distance traveled module 136 to calculate distance traveled 138, as detailed above. Then, the method continues by determining if the distance traveled meets the distance threshold condition (Block 168). In one embodiment, processing engine 42 executes event position determination logic 40 to compare distance traveled 138 to distance threshold 134, as detailed above. If the distance traveled meets the distance threshold condition, then the method concludes that the geographic position is valid, and associates the location fix information, including the geographic position, with the event information, including the event (Block 170). In one embodiment, for example, processing engine 42 executes event position determination module 38 to generate event record 44, as detailed above. Optionally, if the method reaches this point with two sets of location fix information, i.e. a first set corresponding to the closest fix before the event and a second set corresponding to the closest fix after the event, then pick the set of location fix information having the smaller of the two distances traveled (Block 172). If the distance traveled does not meet the distance threshold condition, then the method concludes that the geographic position is not valid, and no association is made between the location fix information, including the geographic position, and the event information, including the event (Block 162).

If the speed is not available, then the method continues by calculating the low time threshold (Block 174). In one embodiment, processing engine 42 executes event position determination logic 40 to divide distance threshold 134 by maximum speed 142 to determine low time threshold value 140, as detailed above. Then, the method continues by determining if the time difference meets the low time threshold condition (Block 176). In one embodiment, processing engine 42 executes event position determination logic 40 to compare time difference 132 to low time threshold value 140, as detailed above. If the time difference meets the low time threshold condition, then the method concludes that the geographic position is valid, and associates the location fix information, including the geographic position, with the event information, including the event (Block 170). In one embodiment, for example, processing engine 42 executes event position determination module 38 to generate event record 44, as detailed above. Optionally, if the method reaches this point with two sets of location fix information, i.e. a first set corresponding to the closest fix before the event and a second set corresponding to the closest fix after the event, then pick the set of location fix information having the smaller of the two time differences (Block 178). If the time difference does not meet the low time threshold condition, then the method concludes that the geographic position is not valid, and no association is made between the location fix information, including the geographic position, and the event information, including the event (Block 162).

Other embodiments of the above-defined method make decisions regarding multiple sets of location fix information.

For example, in one embodiment, one set of device location and speed parameters corresponding to a location fix closest in time before the occurrence of the event may be compared to one set of device location and speed parameters corresponding to a location fix closest in time after the occurrence of the event. The fix that achieves a predetermined time threshold and a predetermined distance threshold is used to estimate the position of the wireless device during the occurrence of the event. There may be situations where both location fixes achieve these thresholds, and thus further criteria are utilized to determine the more valid fix to associate with the event.

For example, in one embodiment, the distance between the location fix closest in time before the occurrence of the event and the event location, is compared to the distance between the location fix closest in time after the occurrence of the event and the event location, and the position fix corresponding to the shorter distance is chosen as the estimated position of the wireless device during the occurrence of the event.

In contrast, in another embodiment, the time difference between the position fix of the wireless device closest in time before the occurrence of the event and the event time, is compared to the time difference between the position fix of the wireless device closest in time after the occurrence of the event and the event time, and the position fix corresponding to the shorter time difference is chosen as the estimated position of the wireless device during the occurrence of the event.

In the operation of these embodiments, FIGS. 6-11 are flow charts illustrating a method for estimating the position of a wireless device corresponding to the occurrence of a wireless device operational event. As used herein, the term "fix" refers to a determined fixed geographical position for the wireless device, and "attached" refers to selecting a particular location fix as the estimated location corresponding to the occurrence of the event. Further, the term "applied" means under consideration for being "attached" to the event, e.g. two fixes may be "applied" to an event, but only one fix may be "attached" to the event.

The following definitions apply for the embodiments described with respect to the figures: G1—the location fix closest in time before the event, including its relevant parameters; G2—the location fix closest in time after the event, including its relevant parameters; TT—time threshold, as defined above, given the value of 120 second in one or more embodiments; DT—distance threshold, as defined above; Maximum Speed—a predetermined, configurable maximum speed, as defined above; LTT—low time threshold, as defined above; D1—estimated distance traveled by the wireless device from the location fix before the event to the event itself, determined by multiplying the speed associated with G1 by the time difference (TD1) between G1 and the event time; D2—estimated distance traveled by the wireless device from the event itself to the location fix after the event, determined by multiplying the speed associated with G2 by the time difference (TD2) between G2 and the event time; and F1, F2, F3, etc.—refer to failure events 1, 2, 3, etc. tracked according to the event tracking module.

Figure 6:
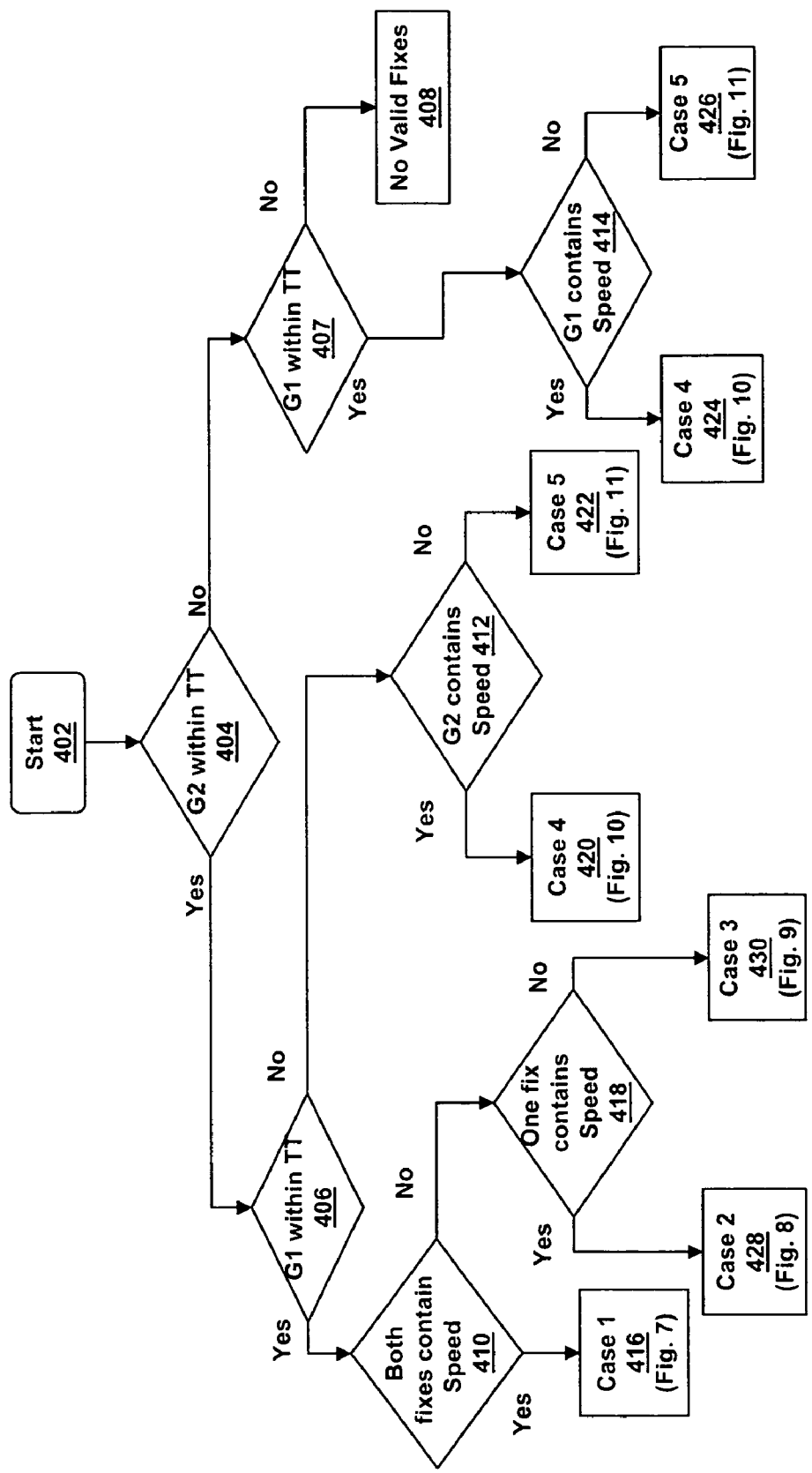
FIG. 6 is a flowchart of another exemplary general embodiment using multiple thresholds to determine a position location for a wireless device corresponding to an event.

Referring to FIG. 6, after start (Block 402), if neither G1 nor G2 are within TT (Blocks 404 and 407), then there are no valid fixes that may be associated with the event (Block 408). In other words, both fixes have occurred outside of the given timeframe, and thus are not considered to validly represent the position the event because they are too far away in time.

Figure 7:
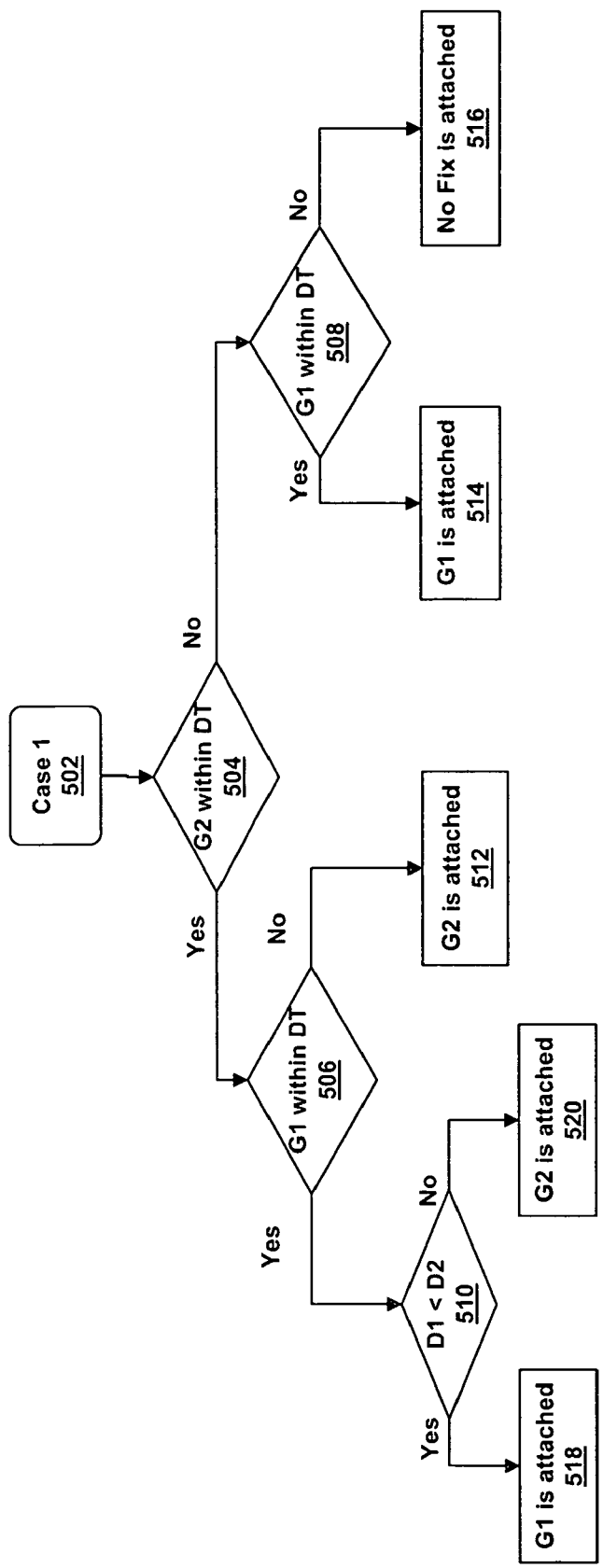
FIG. 7 is a flowchart continuation of FIG. 6 illustrating a first case scenario.

Referring back to FIG. 6, after start (Block 402), control passes to Case 1 of FIG. 7 (Block 416) if G2 is within TT (Block 404), G1 is within TT (Block 406), and both location fixes contain speed (Block 410). In other words, both fixes are within the given timeframe and contain speed information. As such, Case 1 tests these fixes against the distance threshold, and selects either the only fix within the threshold, or the fix having the smallest distance traveled within the threshold.

Referring to FIG. 7 (Block 502), G1 is attached if (i) G2 is within DT (Block 504), G1 is within DT (Block 506), and D1<D2 (Block 510), or if (ii) G2 is not within DT (Block 504) and G1 is within DT (Block 506). G2 is attached if (i) G2 is within DT (Block 504) and G1 is not within DT (Block 506), or if (ii) G2 is within DT (Block 504), G1 is within DT (Block 506) and D2≦D1 (Block 520). If both distances are equal, then G2 is chosen because it occurs after the event and thus may be more likely to be based on the fix request that occurs as a result of detecting the event. If G2 is not within DT (Block 504) and G1 is not within DT (Block 508), then no value is attached (Block 516). So, in this instance, although both fixes meet the time threshold, both fall outside of the distance threshold and are thereby considered to be outside a valid range of positions to associate with the event, as may occur when the wireless device is traveling at a high rate of speed.

Figure 8:
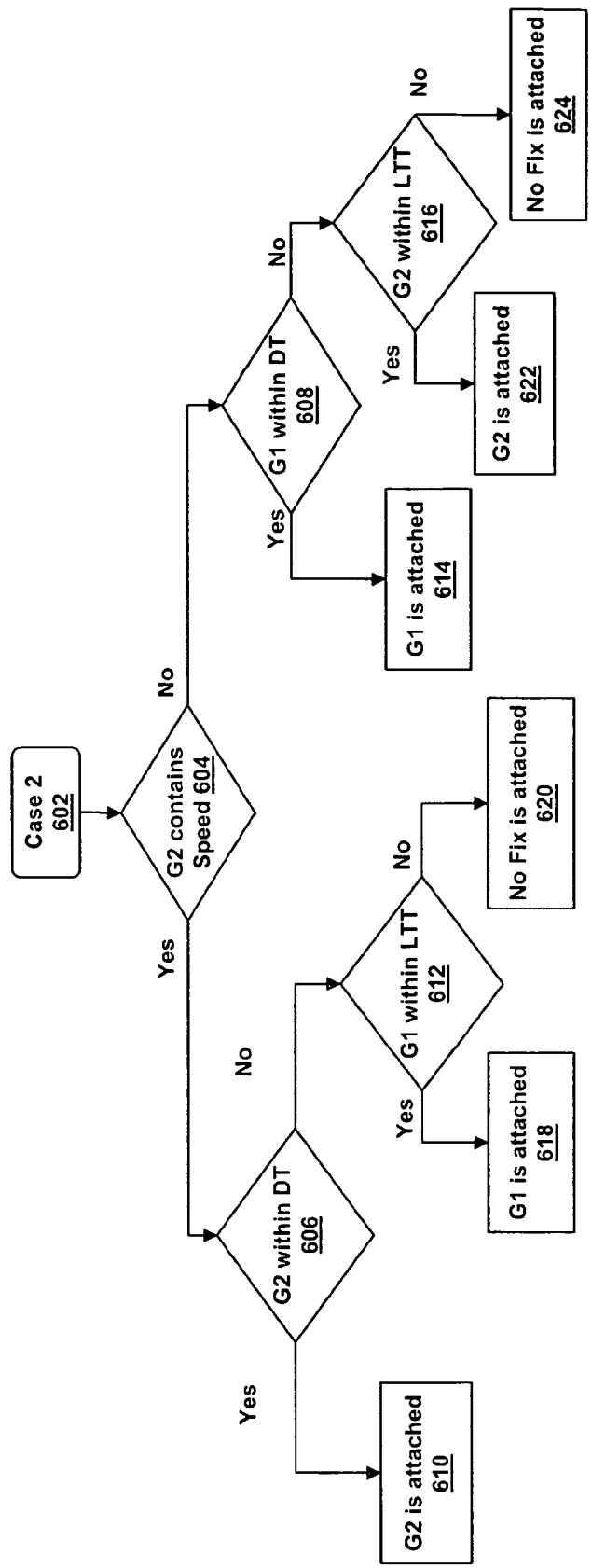
FIG. 8 is a flowchart continuation of FIG. 6 illustrating a second case scenario.

Referring back to FIG. 6, after start (Block 402), control passes to Case 2 of FIG. 8 (Block 428) if both G1 and G2 are within TT (Blocks 404, 406), and only one location fix contains speed (Blocks 410, 418). As such, Case 2 tests these two fixes and first selects the one having speed if it falls within the distance threshold, and if not, then secondly selects the one without the speed it falls within the low time threshold. Alternatively, Case 2 selects neither fix if none of these conditions are satisfied.

Referring to FIG. 8 (Block 602), G1 is attached (Block 618 or 614) if (i) G2 contains speed (Block 604), G2 is not within DT (Block 606), and G1 is within LTT (Block 612), or if (ii) G2 does not contain speed (Block 604) and G1 is within DT (Block 608). G2 is attached (Blocks 610 or 622) if (i) G2 contains speed (Block 604) and G2 is within DT (Block 606), or if (ii) G2 does not contain speed (Block 604), G1 is not within DT (Block 608), and G2 is within LTT (Block 616). No fix is attached (Blocks 620 or 624) if either (i) G2 contains speed (Block 604), G2 is not within DT (Block 606), and G1 is not within LTT (Block 612), or if (ii) G2 does not contain speed (Block 604), G1 is not within DT (Block 608), and G2 is not within LTT (Block 616).

Figure 9:
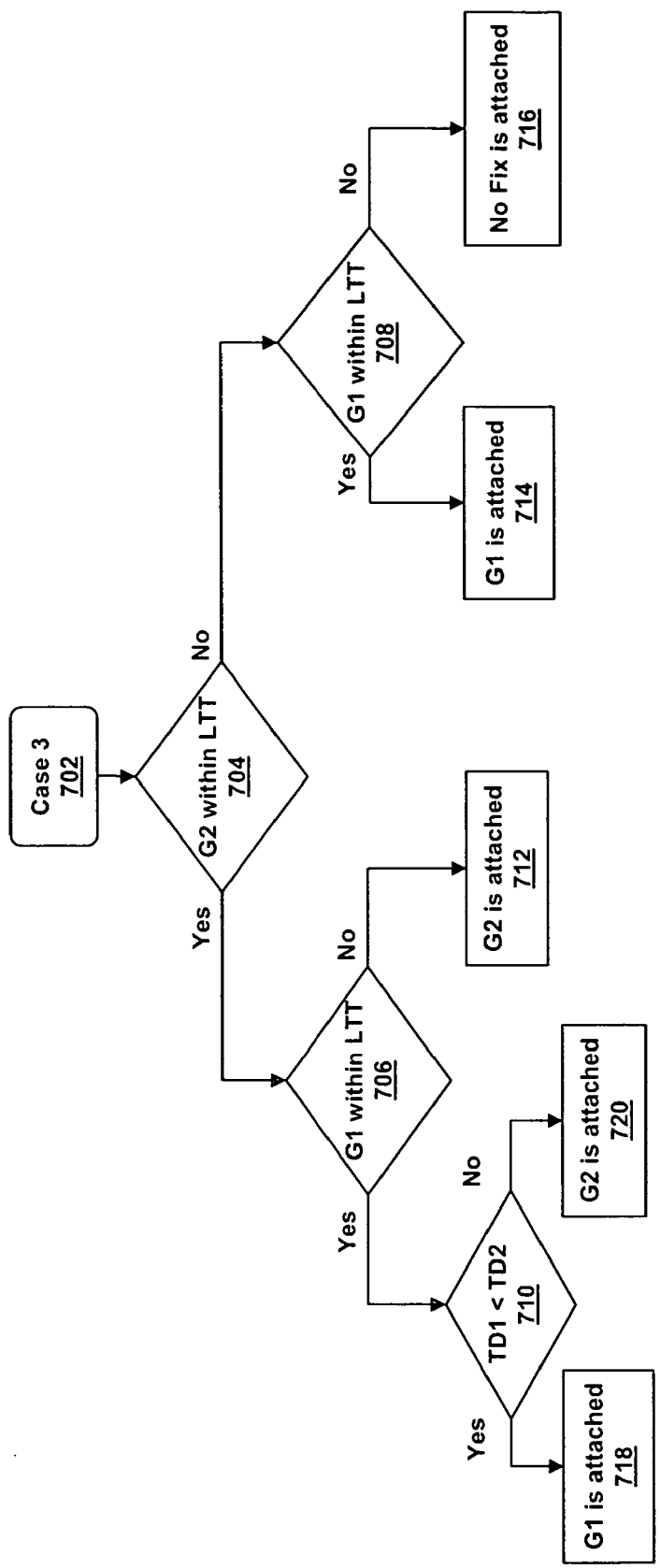
FIG. 9 is a flowchart continuation of FIG. 4 illustrating a third case scenario.

Referring back to FIG. 6, after start (Block 402), control passes to Case 3 of FIG. 9 (Block 430) if G2 is within TT (Block 404), G1 is within TT (Block 406) and neither location fix contains speed (Blocks 410, 418). As such, without having speed information to utilize, Case 3 considers the time difference between each fix and the event time, and selects either the only fix with a time difference within the low time threshold or the fix having the shortest time difference. If none of these conditions are satisfied, then no fix is attached.

Referring to FIG. 9 (Block 702), G1 is attached (Block 718 or 714) if (i) G2 is within LTT (Block 704), G1 is within LTT (Block 706), and TD1<TD2 (Block 710), or if (ii) G2 is not within LTT (Block 704), and G1 is within LTT (Block 708). G2 is attached (Block 720 or 712) if (i) G2 is within LTT (Block 704), G1 is within LTT (Block 706), and TD2≦TD1 (Block 710), or if (ii) G2 is within LTT (Block 704) and G1 is not within LTT (Block 706). No fix is attached if G2 is not within LTT (Block 704) and G1 is not within LTT (Block 708).

Figure 10:
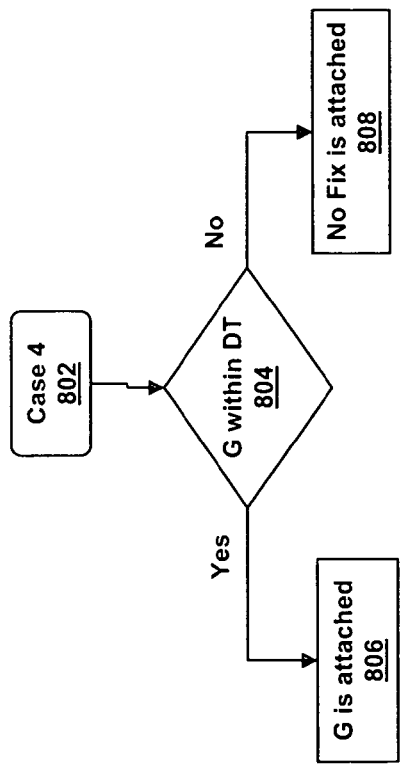
FIG. 10 is a flowchart continuation of FIG. 6 illustrating a fourth case scenario.

Referring back to FIG. 6, after start (Block 402), control passes to Case 4 of FIG. 10 (Blocks 420, 424) if either (i) G2 is within TT (Block 404), G1 is not within TT (Block 406), and G2 contains speed (Block 412), or if (ii) G2 is not within TT (Block 404), G1 is within TT (Block 407), and G1 contains speed (Block 414). As such, when only a single fix is valid based on the time threshold and this fix includes speed information, Case 4 selects the respective fix if it meets the distance threshold or no fix is attached.

Referring to FIG. 10 (Block 802), the G (either G1 or G2) found to be within TT (FIG. 4) is compared to DT (Block 804). If this G is within DT, it is attached (Block 806), and if not, no G is attached (Block 808).

Figure 11:
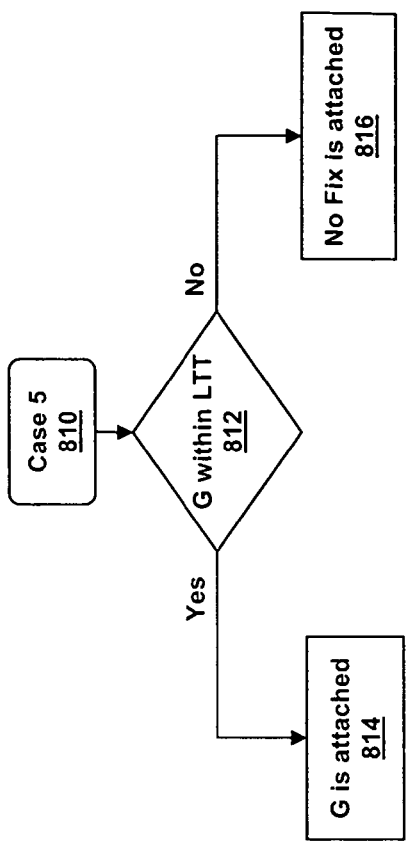
FIG. 11 is a flowchart continuation of FIG. 6 illustrating a fifth case scenario.

Referring back to FIG. 6, after start (Block 402), control passes to Case 5 of FIG. 11 (Blocks 422, 426) if either (i) G2 is within TT (Block 404), G1 is not within TT (Block 406), and G2 does not contain speed (Block 412), or if (ii) G2 is not within TT (Block 404), G1 is within TT (Block 407), and G1 does not contain speed (Block 414). As such, when only a single fix is valid based on the time threshold but this fix does not include speed information, Case 5 selects the respective fix if it has a time difference within the low time threshold, or no fix is attached.

Referring to FIG. 11 (Block 810), the G (either G1 or G2) found to be within TT (FIG. 4) is compared to LTT (Block 812). If this G is within LTT, it is attached (Block 814), and if not, no G is attached (Block 816).

FIGS. 12-29 are time line examples illustrating the above-noted predetermined conditions. In each of these figures, it should be noted that the timeline scenarios include the following parameters: Time Threshold (TT)=120 seconds; Distance Threshold (DT)=609.6 meters, or 2000 feet; Maximum Speed=29.05 meters/second or 65 miles/hour; and, based on DT/(Maximum Speed), Low Time Threshold (LTT)=20.97 seconds.

Figures 12, 13:
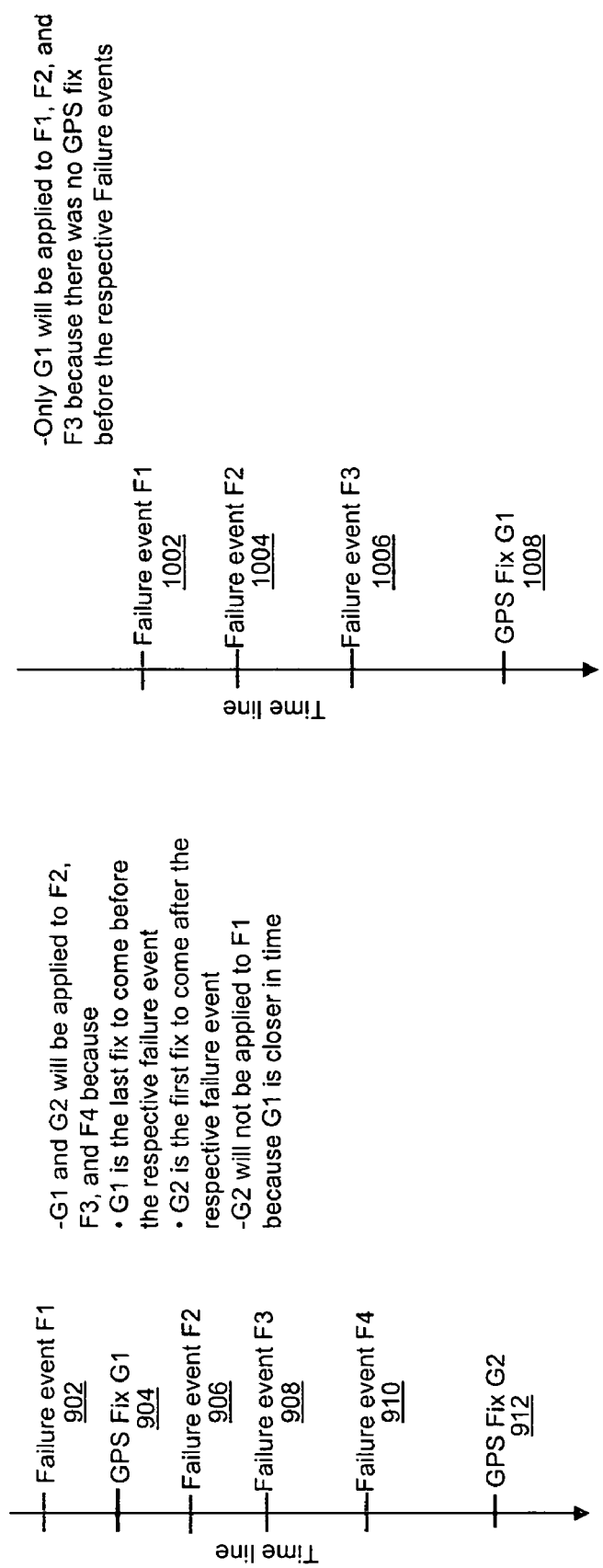
FIGS. 12 and 13 are exemplary time line examples pertaining to an embodiment of two GPS fixes and multiple events.

Beginning with FIGS. 12 and 13, these figures illustrate that it is possible to apply up to two GPS fixes to each event that has not yet had a location fix associated with it. In FIG. 12, G1 904 and G2 912 are applied to F2 906, F3 908 and F4 910 because G1 is the last fix to come before the respective failure and G2 is the first fix to come after the respective failure. In contrast, G2 912 is not applied to F1 902 because G1 904, which is before G2 with respect to the timing of F1, has already been applied to it. In FIG. 13, G1 1008 will be applied to F1 1002, F2 1004 and F3 1006 because there was no previous location fix before these failure events. As such, FIG. 13 illustrates the situation where only one set of location fix information may be utilized in order to determine a geographic position to associate with a detected event on the wireless device.

Figures 14, 15:
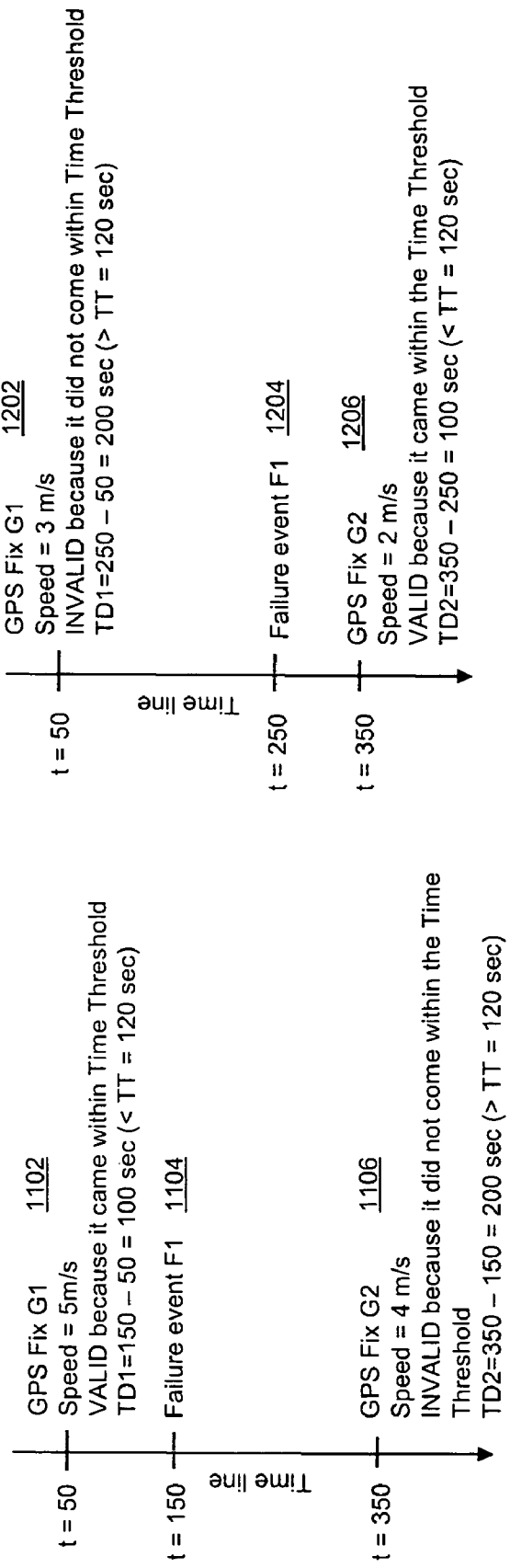
FIGS. 14 and 15 are exemplary time line examples pertaining to the embodiment of FIG. 6.

FIGS. 14 and 15 are general cases for the above noted logic of FIG. 6. In FIG. 14, G1 1102 is valid for F1 1104 because it came within TT, but G2 1106 is invalid because it is not within TT. In FIG. 15, G2 1206 is valid because it came within TT relative to F1 1204, but G1 1202 is invalid because it is not within TT.

Figures 16, 17:
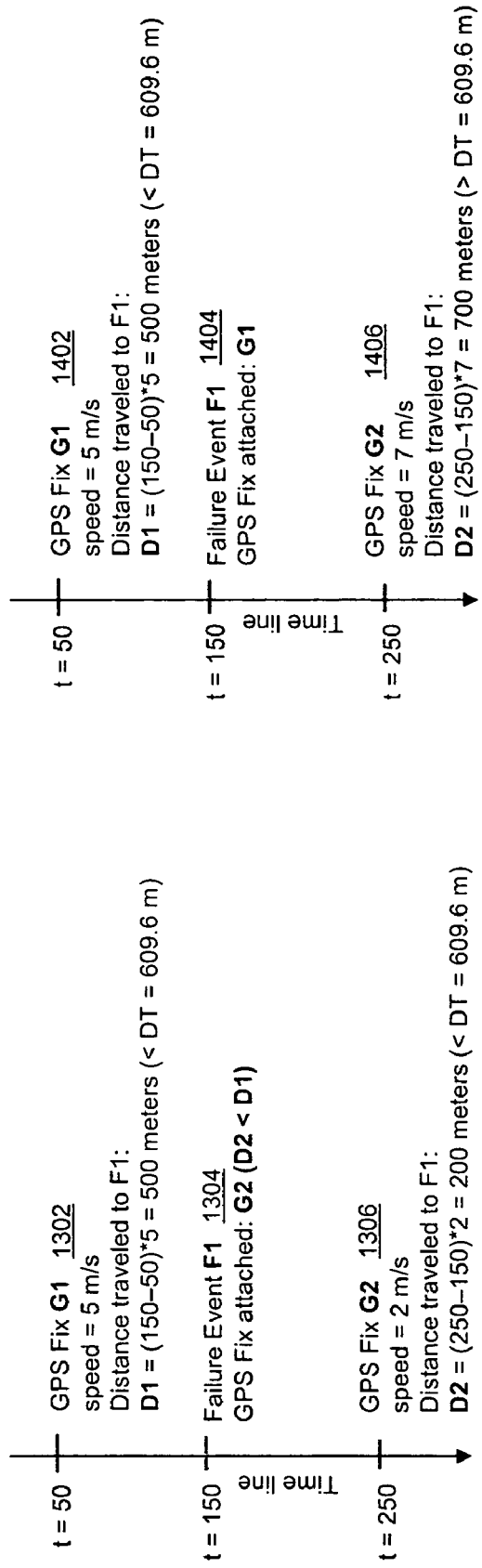
FIGS. 16-18 are exemplary time line examples pertaining to the embodiment of the first case of FIG. 7.
Figures 18, 19:
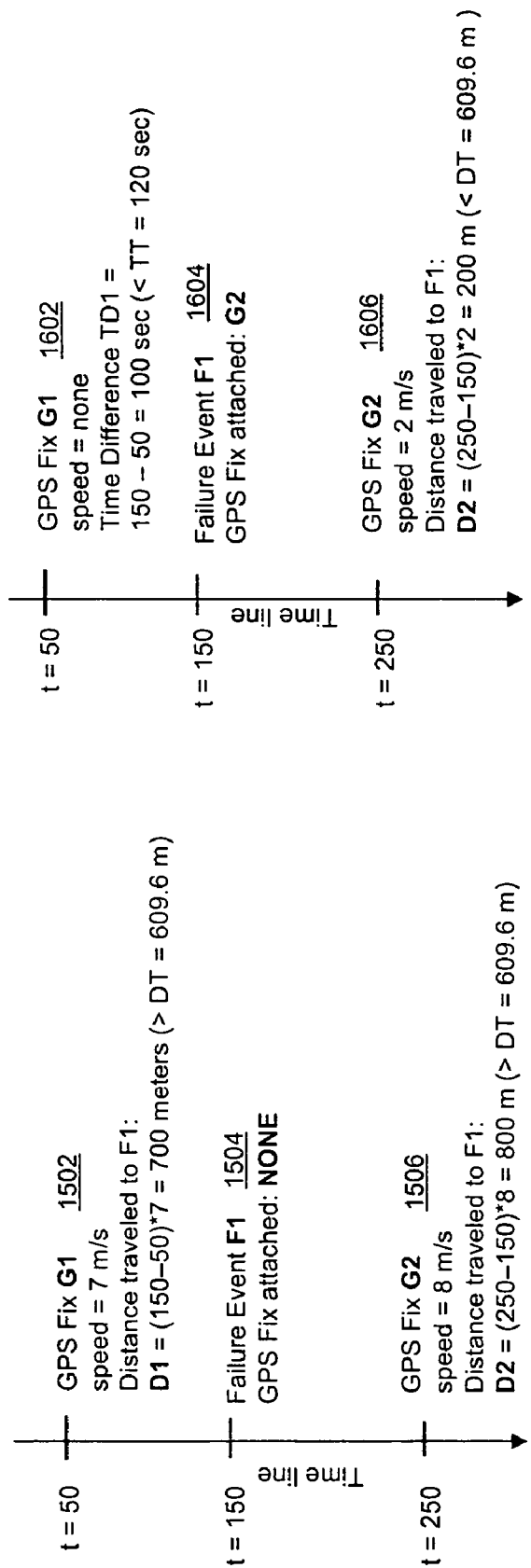
FIGS. 19-22 are exemplary time line examples pertaining to the embodiment of the second case of FIG. 8.

FIGS. 16-18 demonstrate Case 1 of FIG. 7. In FIG. 16, G2 1306 is attached because both G1 1302 and G2 1306 are within DT relative to F1 1304, and D2 is less than D1. In FIG. 17, G1 1402 is attached because relative to F1 1404, G1 1402 is within DT and G2 1406 is outside of DT. In FIG. 18, no location fix is attached, because, relative to F1 1504, neither G1 1502 nor G2 1506 are within DT.

Figures 20, 21:
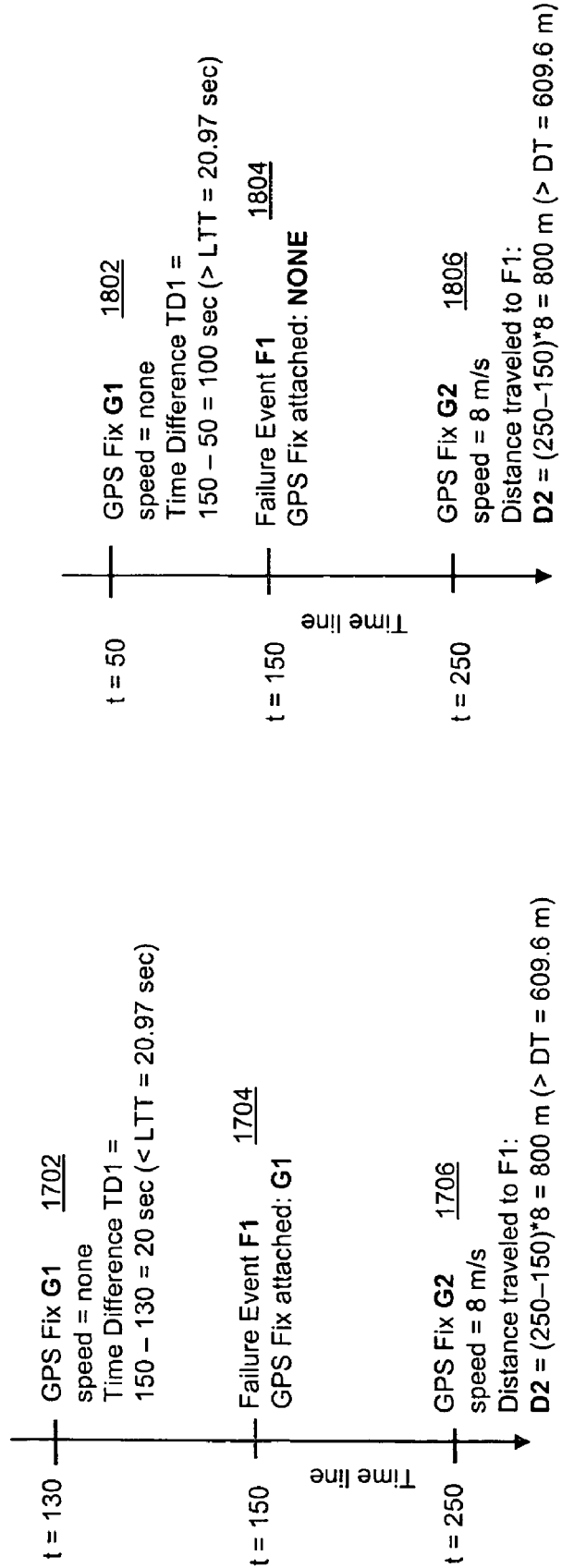
Figures 22, 23:
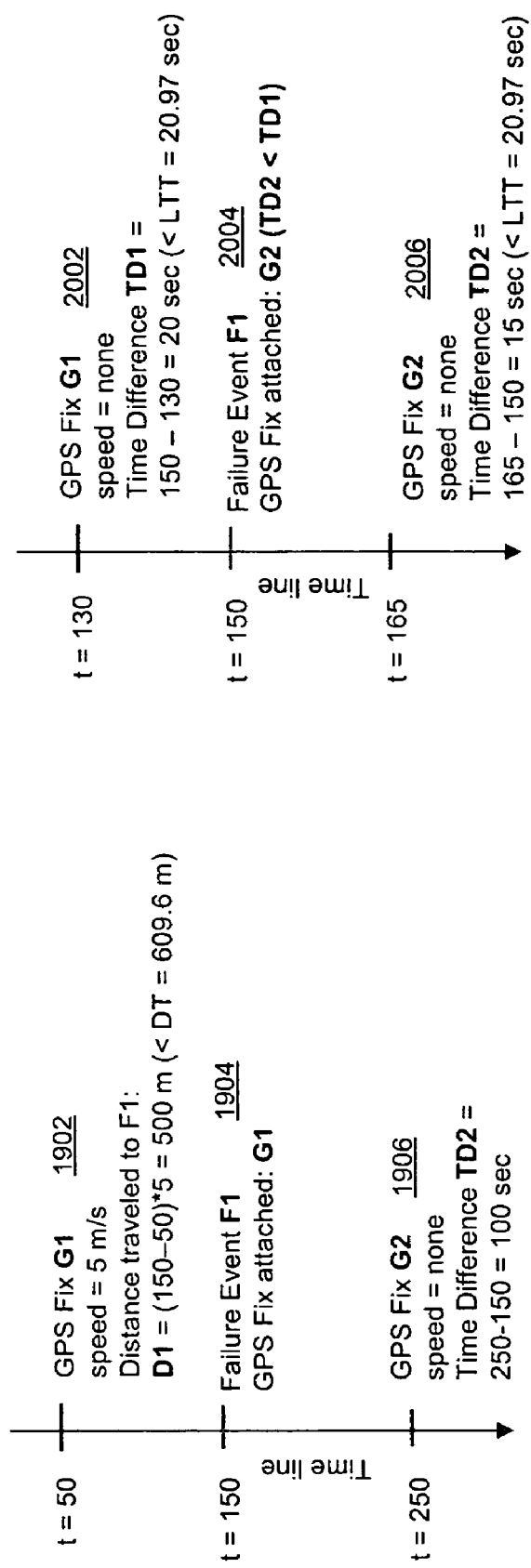
FIGS. 23-25 are exemplary time line examples pertaining to the embodiment of the third case of FIG. 9.

FIGS. 19-22 demonstrate Case 2 of FIG. 8. In FIG. 19, G2 1606 is attached because G2 contains speed and is within DT, and thus gets priority over G1 1602, which is also within DT relative to F1 1604 but does not contain speed. In FIG. 20, G1 1702 is attached because G2 1706 contains speed but is not within DT relative to F1 1704, and G1 is within LTT. In FIG. 21, no location fix is attached because G2 1806 contains speed but is not within DT relative to F1 1804, and G1 1802 is not within LTT. In FIG. 22, G1 1902 is attached because G2 1906 does not contain speed, and G1 contains speed and is within DT relative to F1 1904.

Figures 24, 25:
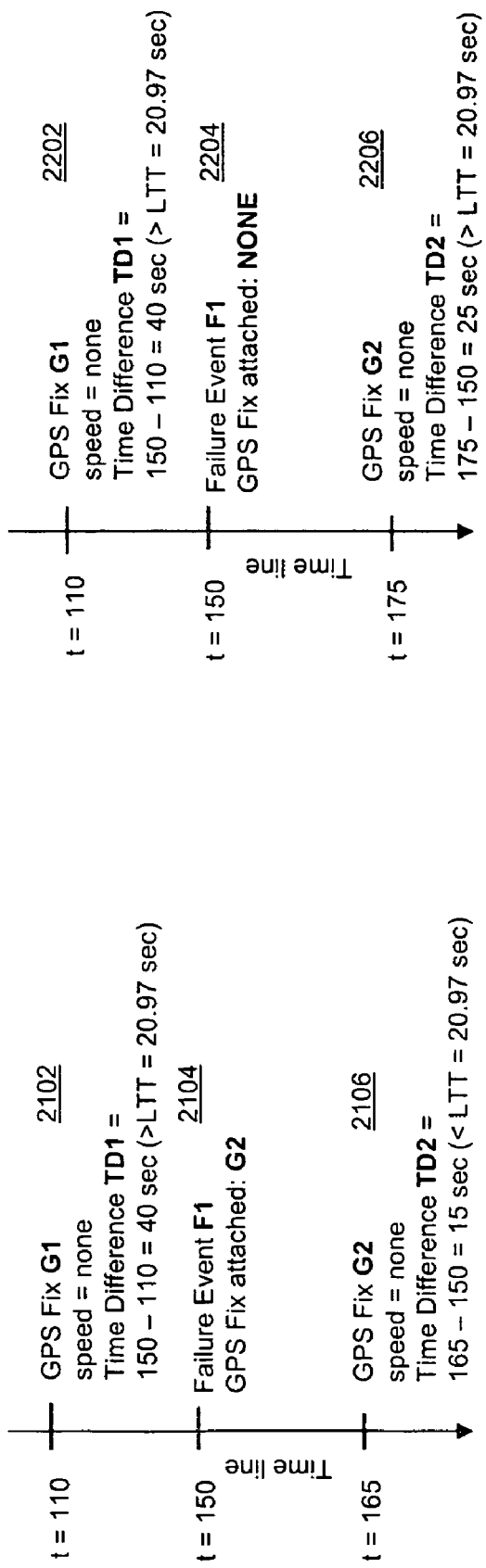

FIGS. 23-25 demonstrate Case 3 of FIG. 9. In FIG. 23, G2 2006 is attached because G2 is within LTT, and event though G1 2002 is within LTT, G2 is selected because TD2<TD1 relative to F1 2004. In FIG. 24, even though both G1 2102 and G2 2106 are within TT relative to F1 2104, G2 2106 is attached because G2 2106 is within LTT and G1 2102 is not within LTT. In FIG. 25, although both G1 2202 and G2 2206 are within TT relative to F1 2204, no location fix is attached because neither G1 nor G2 are within LTT.

Figures 26, 27:
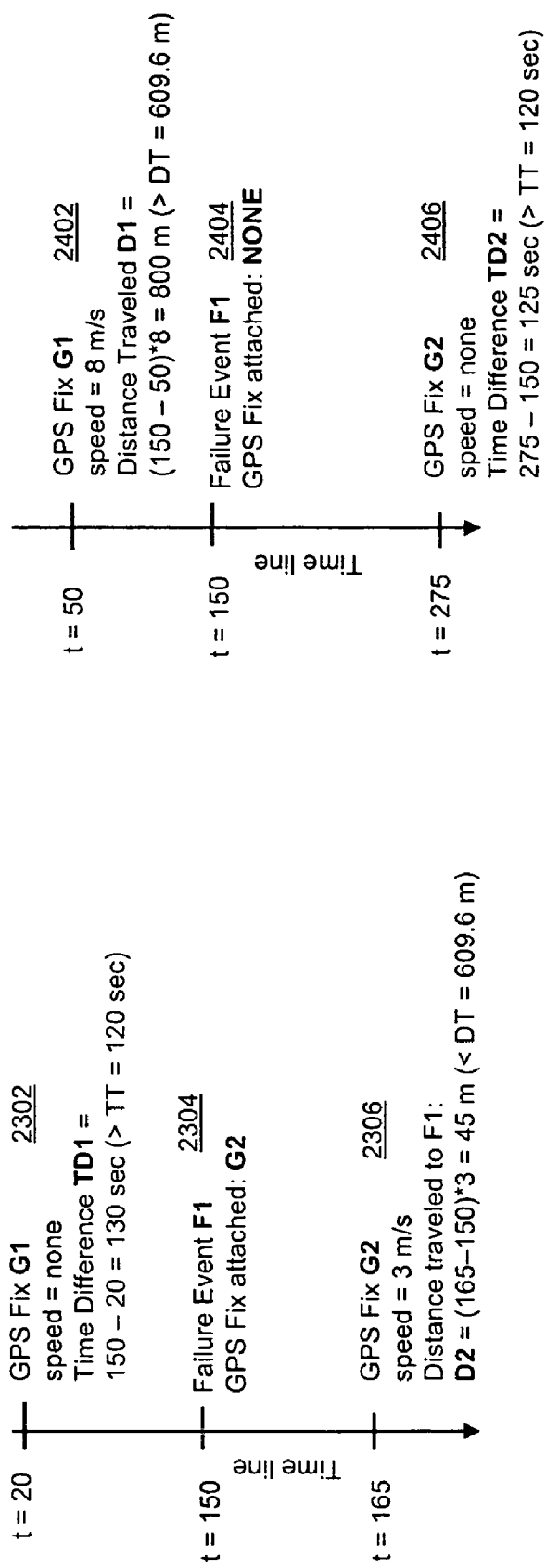
FIGS. 26 and 27 are exemplary time line examples pertaining to the embodiment of the fourth case of FIG. 10.

FIGS. 26 and 27 demonstrate Case 4 of FIG. 10. In FIG. 26, G2 2306 is attached because G1 2302 is not within TT and G2 contains speed and is within DT relative to F1 2304. In FIG. 27, no location fix is attached because G2 2406 is not within TT and G1 2402 is not within DT relative to F1 2404.

Figures 28, 29:
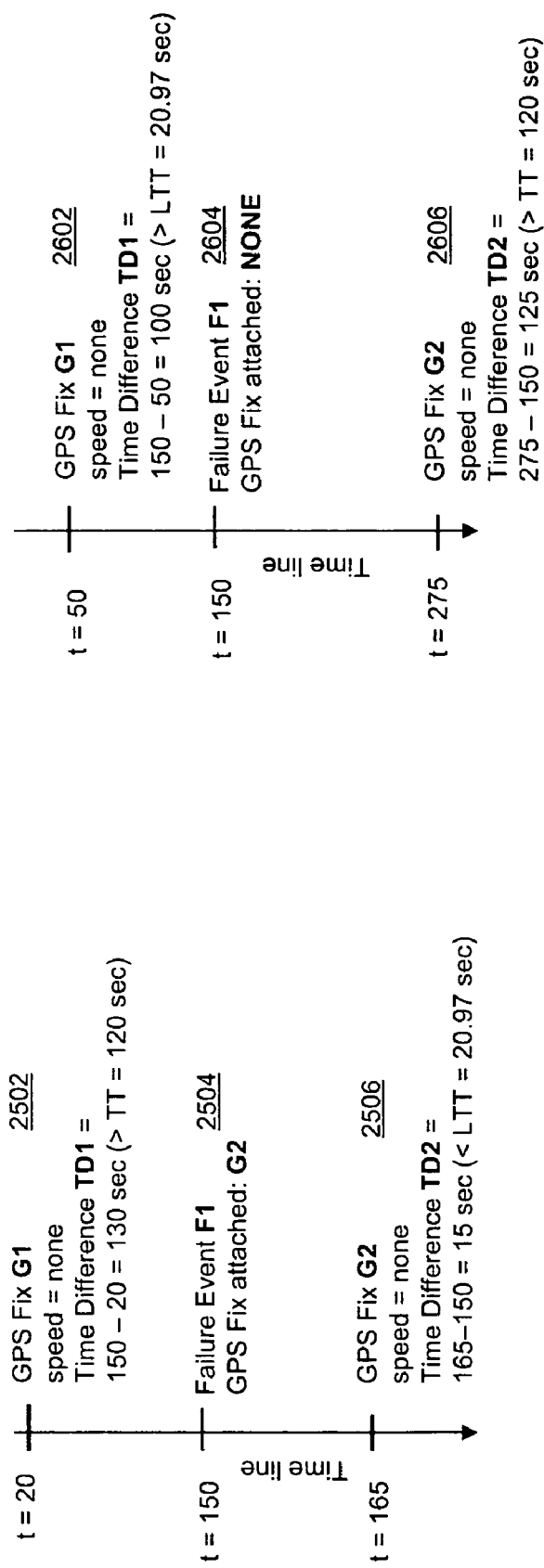
FIGS. 28 and 29 are exemplary time line examples pertaining to the embodiment of the fifth case of FIG. 11.

FIGS. 28 and 29 demonstrate Case 5 of FIG. 11. In FIG. 28, G2 2506 is attached because G1 2502 is not within TT relative to F1 2504 and G2 is within LTT. In FIG. 29, no location fix is attached because G2 2606 is not within TT relative to F1 2604 and G1 2602 is not within LTT.

Additionally, it should be noted that the method may include granting access to event record 44 and/or data log 34 to other business or commercial systems. To ensure the security and/or integrity of the collected position data, such access may be granted in a monitored fashion such as through a user manager. Further, other computer devices, including both storage and processing devices, can be located across the wireless network from the wireless device, and accordingly, the architecture associated with the user manager is readily scalable.

In summary, wireless device 12, 14, 16, 17, 18 can have at least one application or agent resident (either permanent or temporarily) on the computer platform 56 thereof which causes the gathering of event information 24 and location fix information 28 from communications processing engine 82, and which can effect selective transmission of data log 34 for that wireless device to another computer device (such as user manager server 36) on the wireless network 32. If the wireless device 12, 14, 16, 17, 18 is so embodied, data log 34 may be transmitted over an open communication connection from the wireless device 12, 14, 16, 17, 18 to the wireless network 32, such as an open voice or data call. If the wireless device is a cellular telephone 12 and the wireless network is a cellular telecommunication network, such as shown in FIG. 2, data log 34 can be transmitted through short message service or other wireless communication methods.

In view of portions of the method being executable on computer platform 56 of a wireless device 12, 14, 16, 17, 18 and executed by processing engine 42 of user manager 36, the method includes a program resident in a computer readable medium, where the program directs a wireless device 12, 14, 16, 17, 18 having a device platform 56 to perform collection, storage and transmission acts of the method. Such a program can be executed on any single computer platform, or can be executed in a distributed way among several computer platforms. Furthermore, the method can be implemented by a program that directs a computer device such as user manager server 36 to evaluate the validity of a geographic position in association with an event through gathering and processing data log 34 from the wireless devices 12, 14, 16, 17, 18.

The computer readable medium can be the memory 78 of the computer platform 56 of the cellular telephone 12, or other wireless device 14, 16, 17, 18, or can be in a local database, such as local database 80 of the device platform 50, or can be a data repository associated with user manager 36. Further, the computer readable medium can be in a secondary storage media that is loadable onto a wireless device computer platform or user manager, such as a magnetic disk or tape, optical disk, hard disk, flash memory, or other storage media as is known in the art.

Further, the method may be implemented, for example, by operating portion(s) of the wireless network 32 and/or LAN 72, such as device platform 56 and user manager server 36, to execute a sequence of machine-readable instructions. The instructions can reside in various types of signal-bearing or data storage primary, secondary, or tertiary media. The media may comprise, for example, RAM (not shown) accessible by, or residing within, the components of the wireless network 32 or LAN 58. Whether contained in RAM, a diskette, or other secondary storage media, the instructions may be stored on a variety of machine-readable data storage media, such as DASD ("direct access storage device") storage (e.g., a conventional "hard drive" or a RAID ("redundant array of independent disks") array), magnetic tape, electronic read-only memory (e.g., ROM, EPROM, or EEPROM), flash memory cards, an optical storage device (e.g. CD-ROM, WORM (write once, read many), DVD, digital optical tape), paper "punch" cards, or other suitable data storage media including digital and analog transmission media.

While the foregoing disclosure shows illustrative embodiments, it should be noted that various changes and modifications could be made herein without departing from the scope of the described embodiments as defined by the appended claims. Furthermore, although elements of the described embodiments may be described or claimed in the singular, the plural is contemplated unless limitation to the singular is explicitly stated.

What is claimed is:

1. A method for estimating a geographical position corresponding to a wireless device event, comprising:
    receiving at least one of a first geographical position data of the wireless device corresponding to a first position of the wireless device before a time of the event and a second geographical position data of the wireless device corresponding to a second position of the wireless device after a time of the event;
    determining an estimated geographical position of the wireless device at an occurrence of the event based on a predetermined relationship between the event and at least one of said first geographical position data and said second geographical position data; and
    wherein determining the estimated geographical position further comprises selecting one of said first position and said second position as the estimated geographic position according to one of:
        determining that a respective time difference between the time of the event and a respective time of one of said first geographical position data and said second geographical position data is within both a predetermined maximum time threshold and a predetermined low time threshold, wherein if both of said first geographical position data and said second geographical position data have a respective time difference within the predetermined low time threshold, then choosing one of said first position and said second position corresponding to the respective time difference having a smallest value; or
        determining that a respective time difference between the time of the event and a respective time of one of said first geographical position data and said second geographical position data is within a predetermined maximum time threshold, and determining that a respective distance traveled between the time of the event and a respective time of one of said first geographical position data and said second geographical position data is within a predetermined distance threshold wherein if both of said first geographical position data and said second geographical position data have a respective time difference within the predetermined maximum time threshold and a respective distance traveled within the predetermined distance threshold, then choosing one of said first position and said second position corresponding to the respective distance traveled having a smallest value.

2. An apparatus for estimating a geographical position corresponding to a wireless device event, comprising:
    an event position determination module operable to receive at least one of a first geographical position data of the wireless device corresponding to a first position of the wireless device before a time of the event and a second geographical position data of the wireless device corresponding to a second position of the wireless device after a time of the event; and
    said event position determination module is further operable to determine an estimated geographical position of the wireless device at an occurrence of the event based on a predetermined relationship between the event and at least one of said first geographical position data and said second geographical position data; and
    wherein said event position determination module is further operable to select one of said first position and said second position as the estimated geographic position according to one of:
        determining that a respective time difference between the time of the event and a respective time of one of said first geographical position data and said second geographical position data is within both a predetermined maximum time threshold and a predetermined low time threshold, wherein if both of said first geographical position data and said second geographical position data have a respective time difference within the predetermined low time threshold, then choosing one of said first position and said second position corresponding to the respective time difference having a smallest value; or
        determining that a respective time difference between the time of the event and a respective time of one of said first geographical position data and said second geographical position data is within a predetermined maximum time threshold, and determining that a respective distance traveled between the time of the event and a respective time of one of said first geographical position data and said second geographical position data is within a predetermined distance threshold, wherein if both of said first geographical position data and said second geographical position data have a respective time difference within the predetermined maximum time threshold and a respective distance traveled within the predetermined distance threshold then choosing one of said first position and said second position corresponding to the respective distance traveled having a smallest value.

* * * * *